US012759167B2

(12) United States Patent
Sodeyama

(10) Patent No.: US 12,759,167 B2
(45) Date of Patent: Oct. 13, 2026

(54) ROBOT HAND AND MANIPULATOR

(71) Applicant: SONY GROUP CORPORATION, Tokyo (JP)

(72) Inventor: Yoshinao Sodeyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 902 days.

(21) Appl. No.: 18/002,058

(22) PCT Filed: Jun. 3, 2021

(86) PCT No.: PCT/JP2021/021279
§ 371 (c)(1),
(2) Date: Dec. 16, 2022

(87) PCT Pub. No.: WO2022/004270
PCT Pub. Date: Jan. 6, 2022

(65) Prior Publication Data

US 2023/0226701 A1 Jul. 20, 2023

(30) Foreign Application Priority Data

Jun. 29, 2020 (JP) ................................ 2020-112135

(51) Int. Cl.
*B25J 15/00* (2006.01)
*B25J 19/02* (2006.01)

(52) U.S. Cl.
CPC ........... *B25J 15/0009* (2013.01); *B25J 19/02* (2013.01)

(58) Field of Classification Search
None
See application file for complete search history.

(56) References Cited

U.S. PATENT DOCUMENTS 5,200,679 A * 4/1993 Graham ............... B25J 15/0009 901/33
6,247,738 B1 * 6/2001 Winkel .................... B25J 15/10 294/111

(Continued)

FOREIGN PATENT DOCUMENTS

JP 2005088147 A 4/2005
JP 2006000966 A * 1/2006
JP 2012024882 A * 2/2012
JP 5064566 B2 10/2012

(Continued)

OTHER PUBLICATIONS

Butterfass et al. "DLR-Hand II: next generation of a dextrous robot hand" Proceedings 2001 ICRA, pp. 109-114 vol. 1, doi:10.1109/robot.2001.932538 (Year: 2001).*

(Continued)

*Primary Examiner* — Daniel L Greene
(74) *Attorney, Agent, or Firm* — CHIP LAW GROUP

(57) ABSTRACT

Provided is a robot hand that includes a palm section, a first finger that includes a finger pad surface, and a second finger having a finger pad surface opposed to the finger pad surface of the first finger. The palm section includes a proximal joint that couples the second finger to the palm section pivotably about a first axis. The second finger includes a base phalanx section, a distal phalanx section, and a middle phalanx section provided between the base phalanx section and the distal phalanx section. Furthermore, the second finger includes a middle joint and a distal joint, the middle joint that couples the middle phalanx section to the base phalanx section bendably and strechably about a second axis, and the distal joint that couples the distal phalanx section to the middle phalanx section bendably and strechably about a third axis.

17 Claims, 23 Drawing Sheets

(56) References Cited

U.S. PATENT DOCUMENTS

| | | | | |
|---|---|---|---|---|
| 8,260,458 | B2 * | 9/2012 | Kim | B25J 13/081 294/213 |
| 8,287,017 | B2 | 10/2012 | Koyama | |
| 8,549,952 | B2 | 10/2013 | Matsukuma | |
| 11,897,122 | B2 * | 2/2024 | Kim | B25J 9/104 |
| 2008/0114491 | A1 * | 5/2008 | Takahashi | B25J 13/082 901/1 |
| 2011/0133502 | A1 * | 6/2011 | Koyama | B25J 15/08 294/106 |
| 2011/0241368 | A1 * | 10/2011 | Kurita | B25J 15/0009 700/254 |
| 2013/0325181 | A1 * | 12/2013 | Moore | B25J 13/086 901/31 |
| 2018/0257245 | A1 * | 9/2018 | Takemura | B25J 15/08 |
| 2020/0139558 | A1 * | 5/2020 | Vu | B25J 13/081 |

FOREIGN PATENT DOCUMENTS

| | | | |
|---|---|---|---|
| JP | 2014-161997 | A | 9/2014 |
| JP | 2017-164899 | A | 9/2017 |
| WO | WO-2017159504 | A1 | 9/2017 |

OTHER PUBLICATIONS

Tins, Du, "Newest—WJ Tech DEVO Robot Demo Video", YouTube, uploaded on Aug. 12, 2018, screenshot of minute 3:02, available at https://youtu.be/gNHB5CYjYQw?si=FenbPruBZCjIVg5S, last accessed Feb. 5, 2026 (Year: 2018).*

International Search Report and Written Opinion of PCT Application No. PCT/JP2021/021279, issued on Aug. 17, 2021, 09 pages of ISRWO.

* cited by examiner

[FIG. 1]
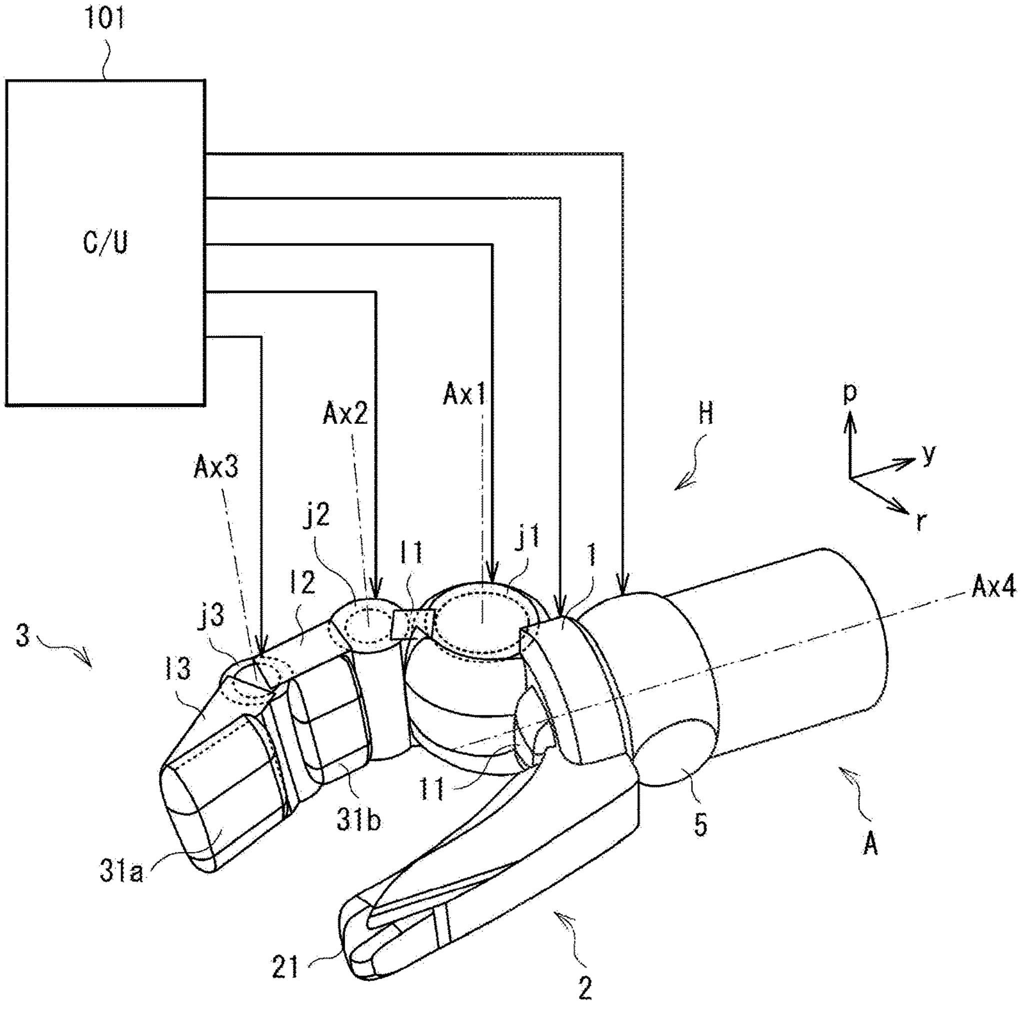

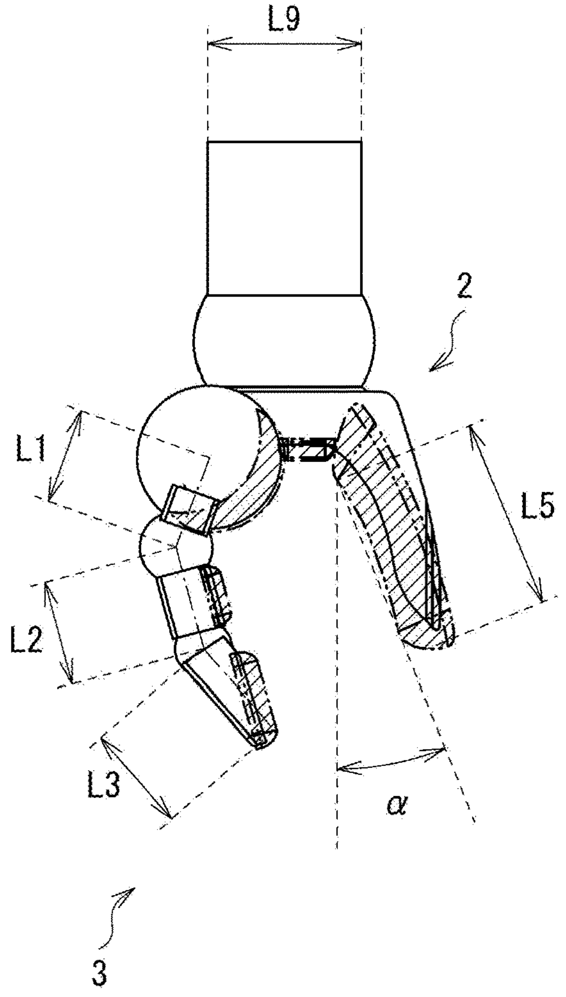
[FIG. 2A]
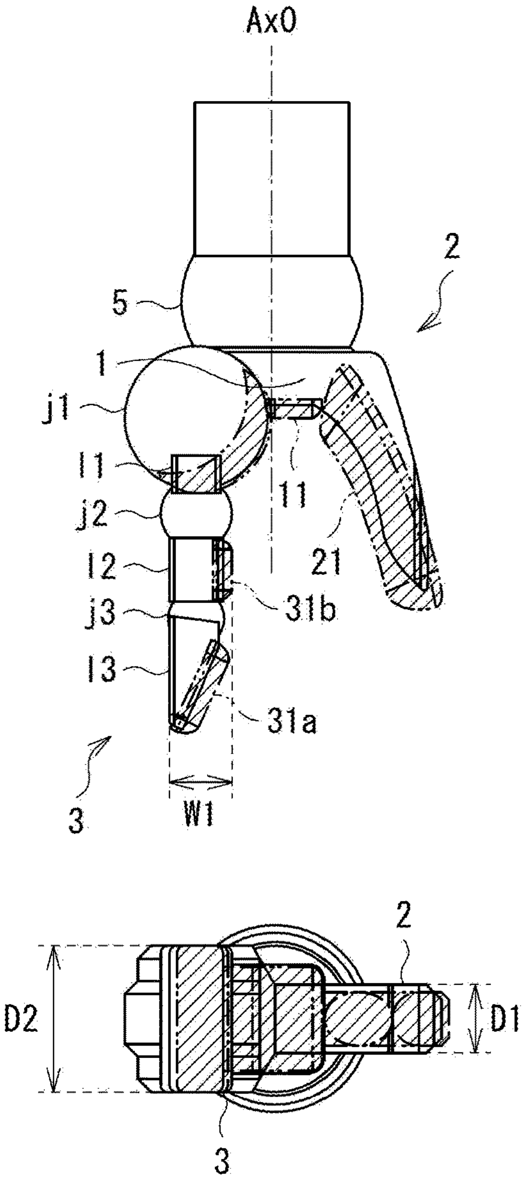
[FIG. 2B]

[FIG. 3A]
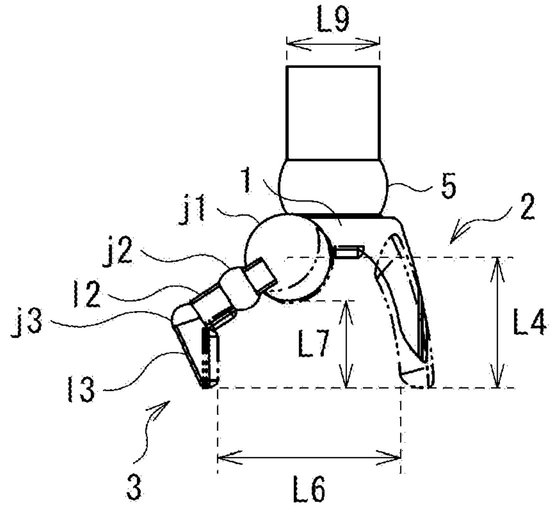
[FIG. 3B]
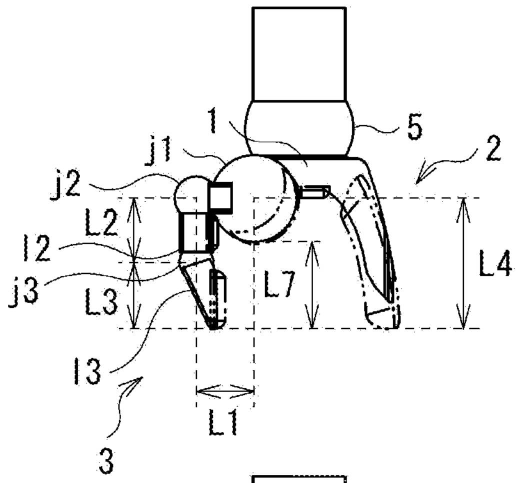
[FIG. 3C]
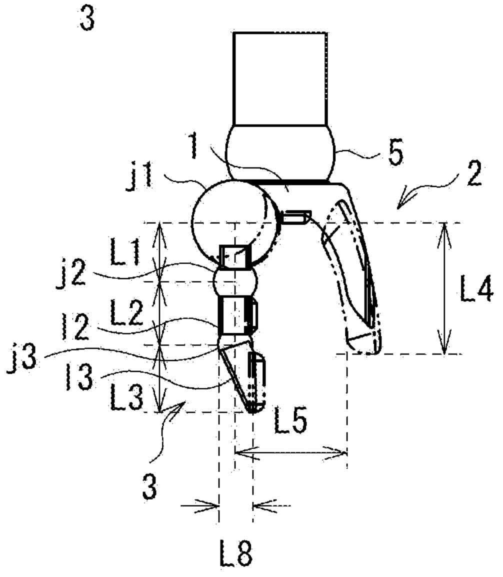

[FIG. 4]
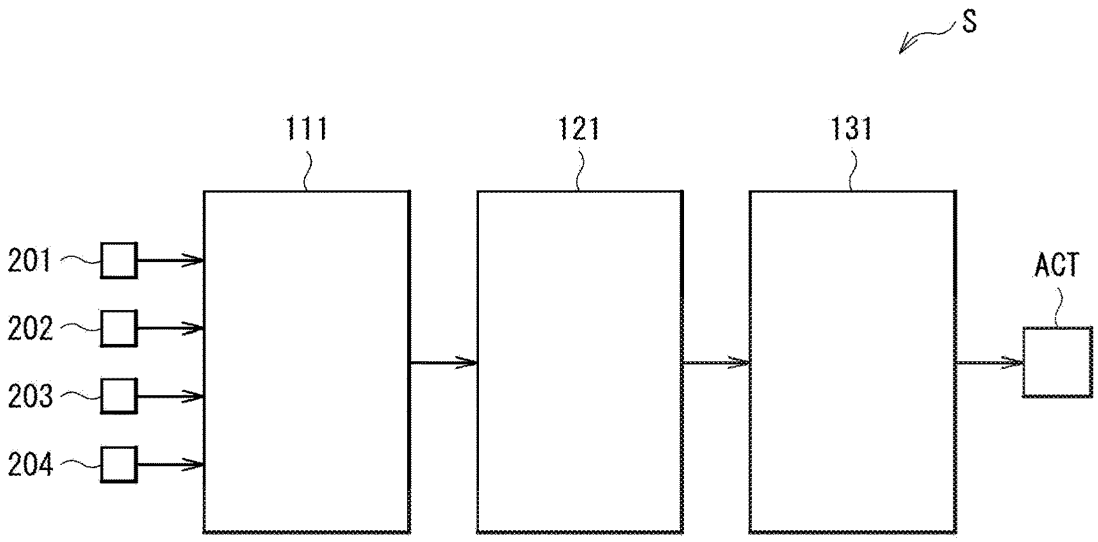

[FIG. 5]
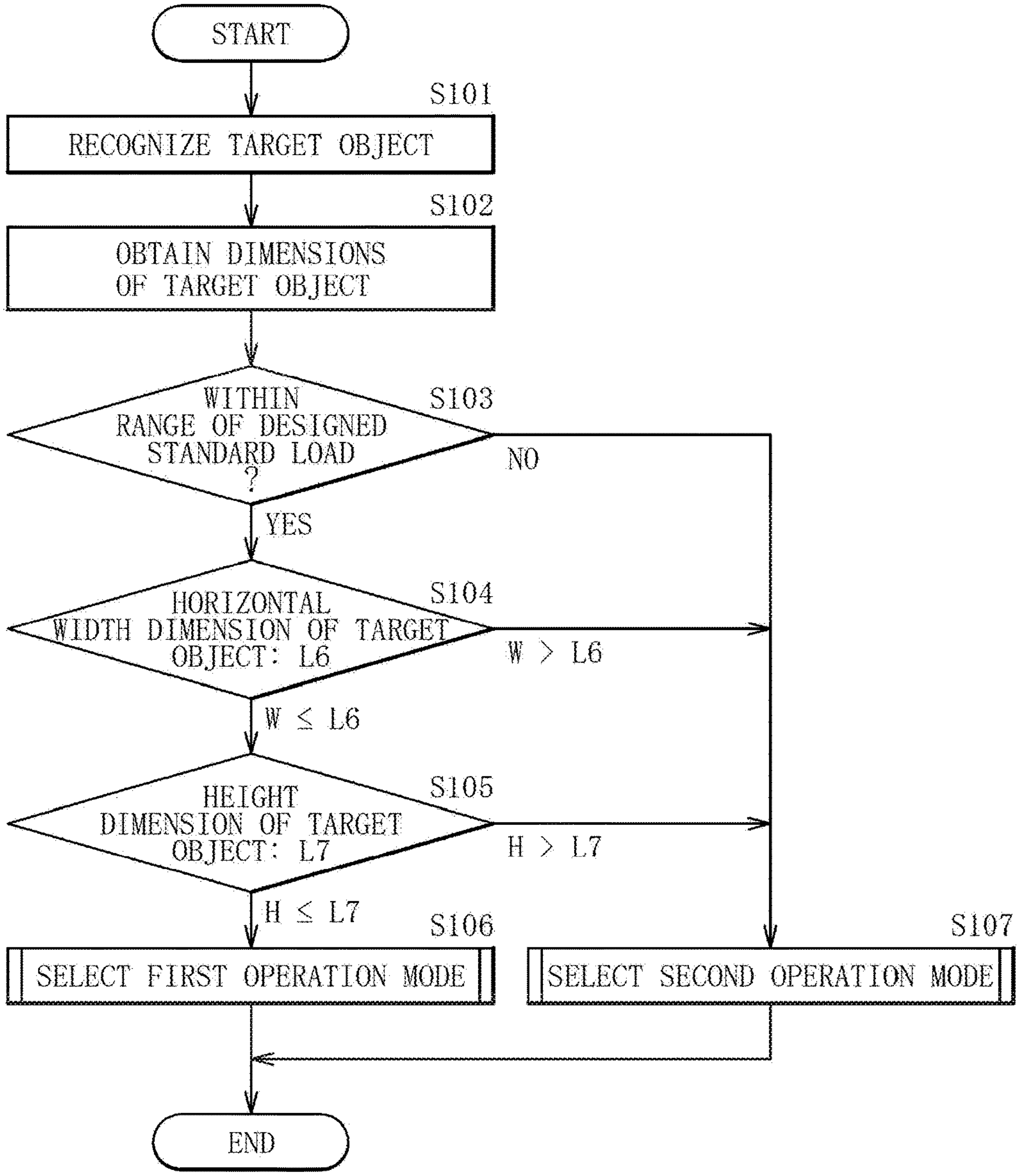

[FIG. 6]
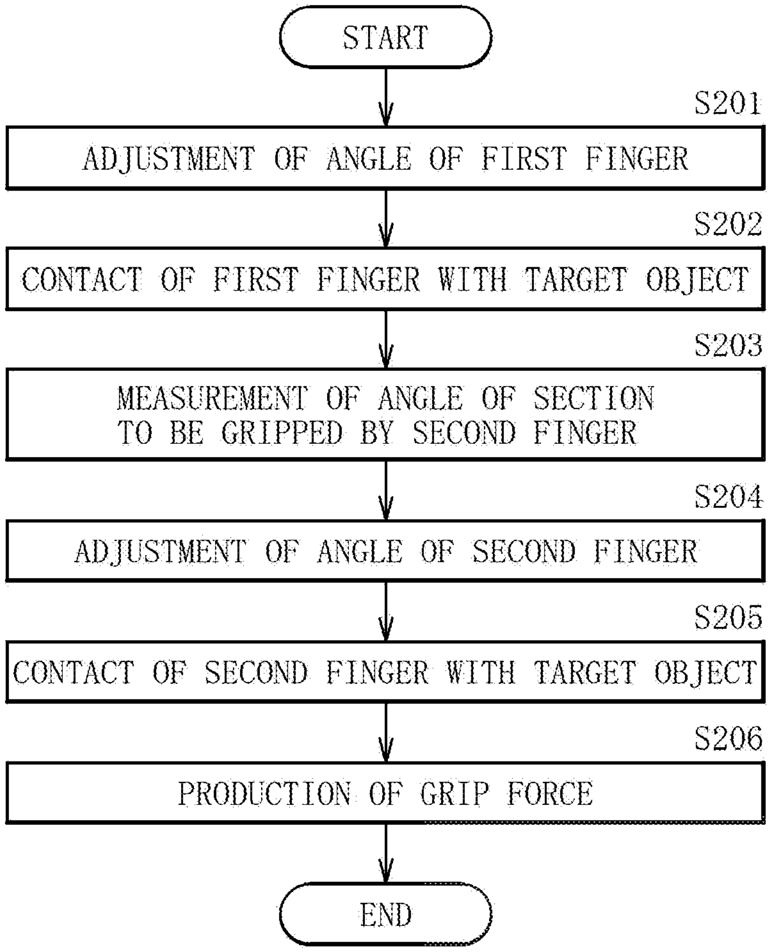

[FIG. 7]
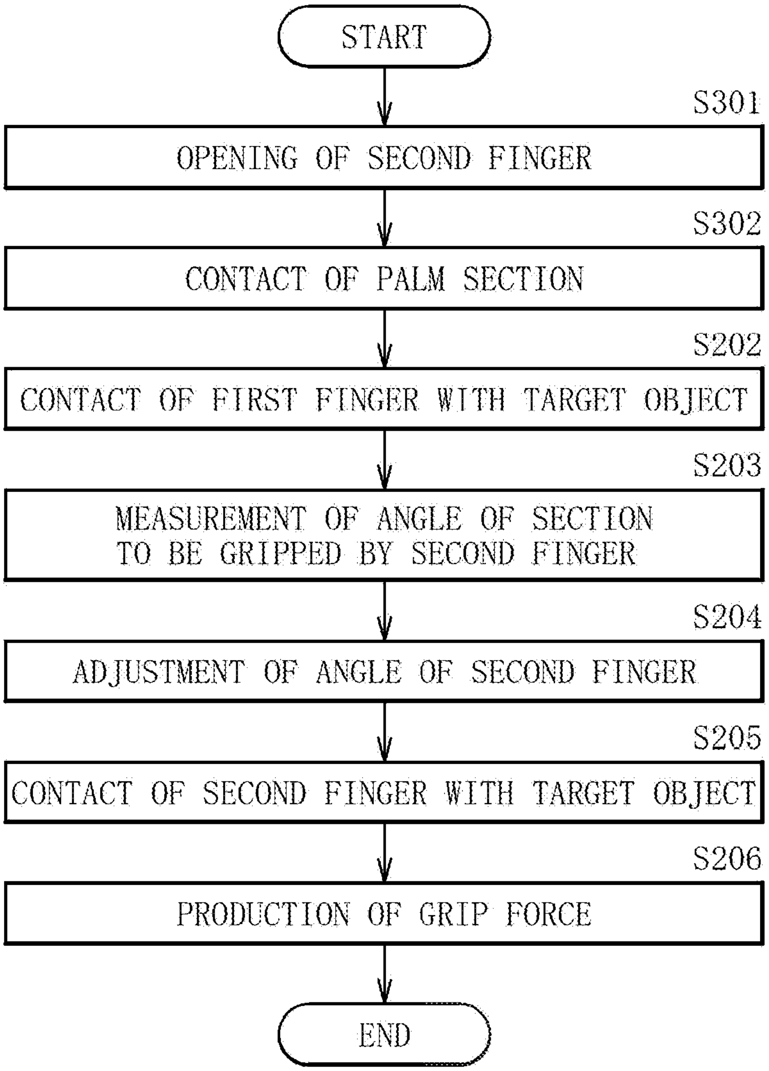

[FIG. 8]
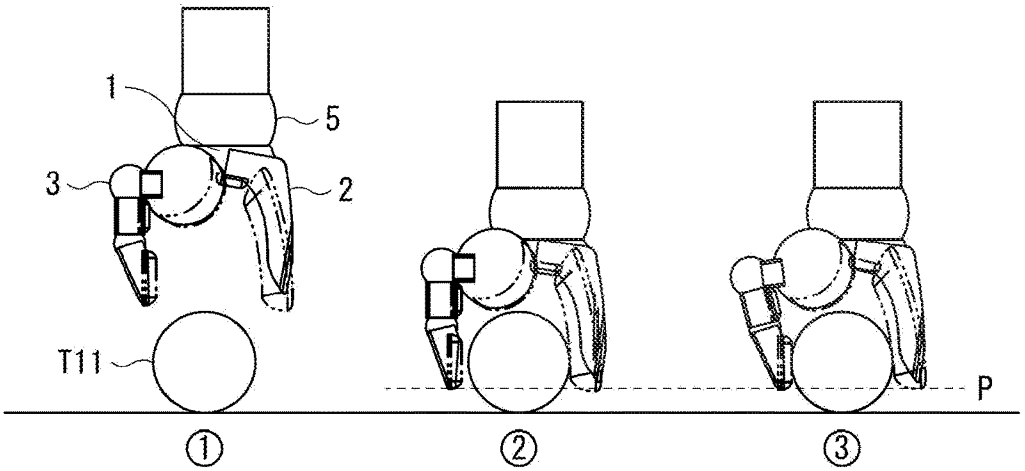

[FIG. 9A]
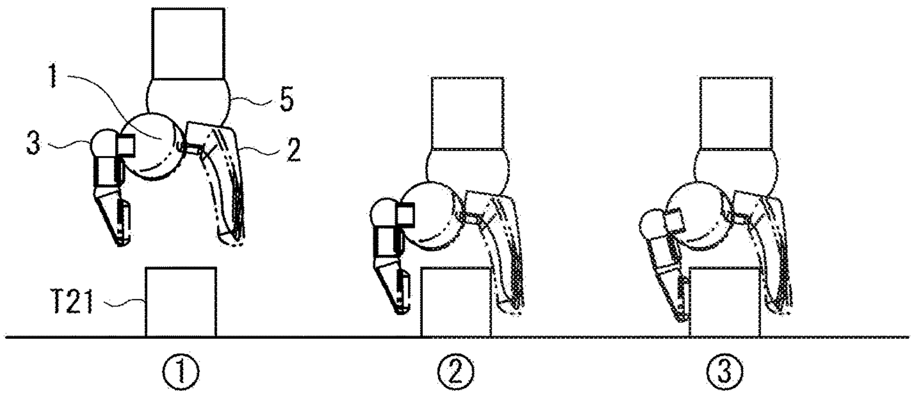
[FIG. 9B]
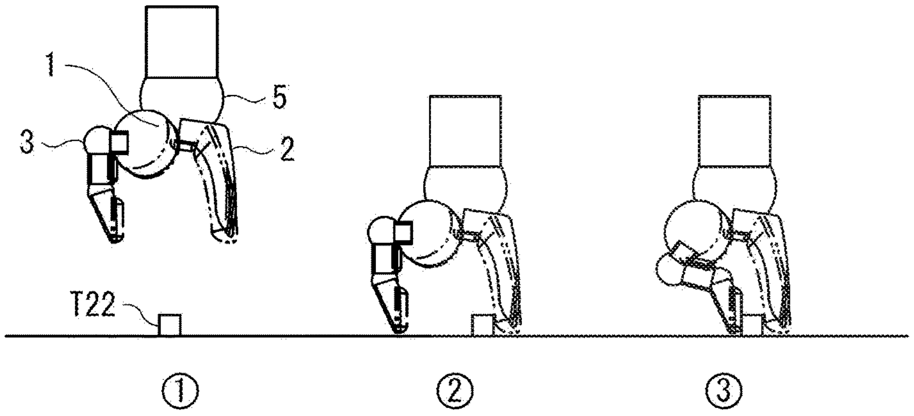
[FIG. 9C]
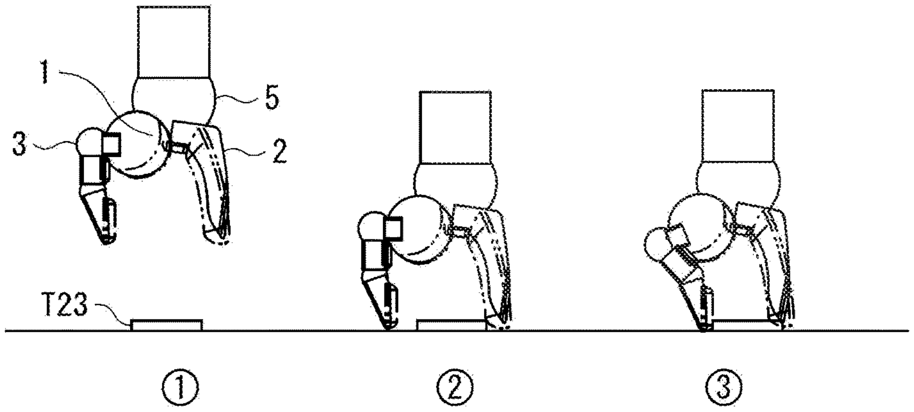

[FIG. 10A]
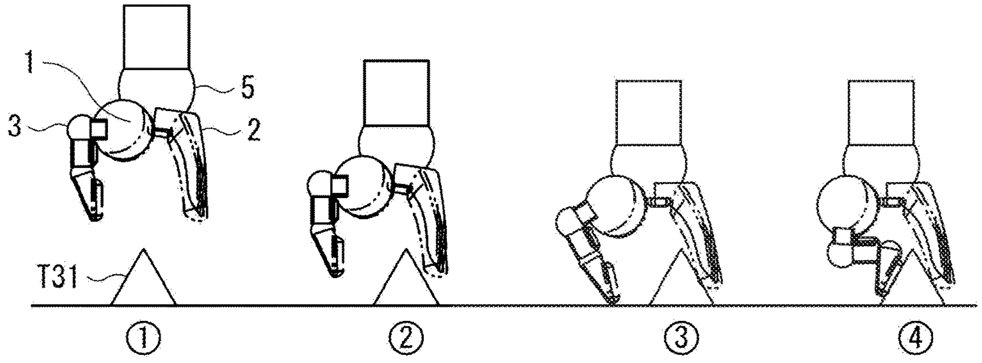
[FIG. 10B]
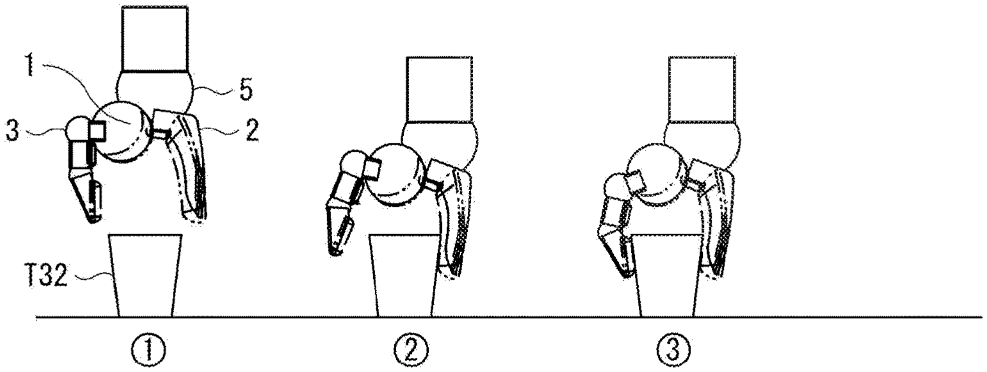

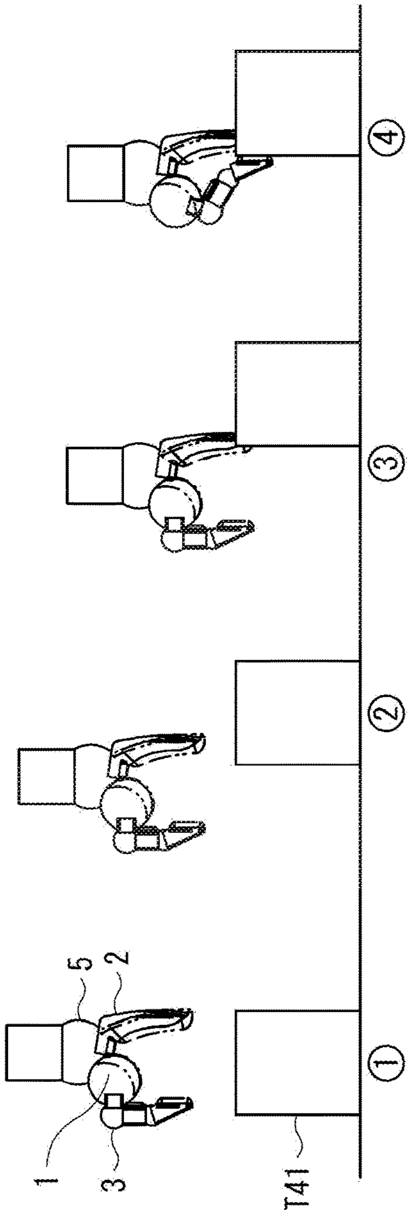
[FIG. 11A]
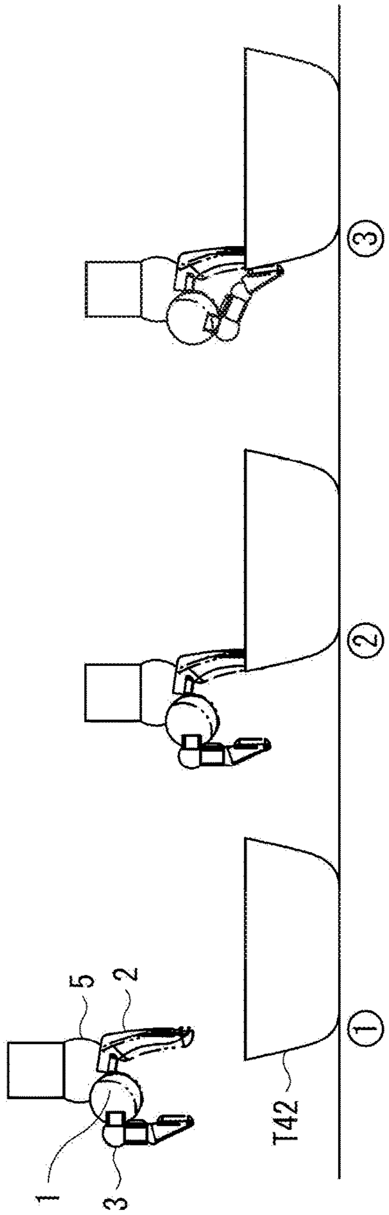
[FIG. 11B]
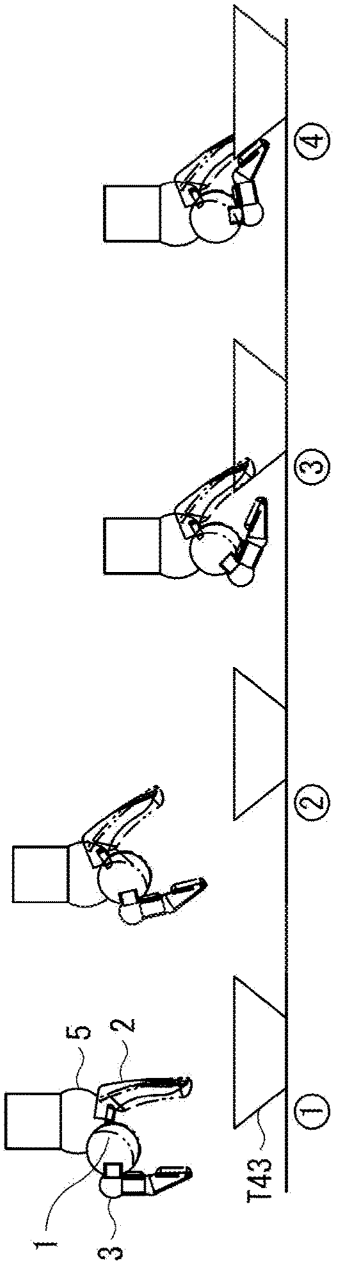
[FIG. 11C]

[FIG. 12]
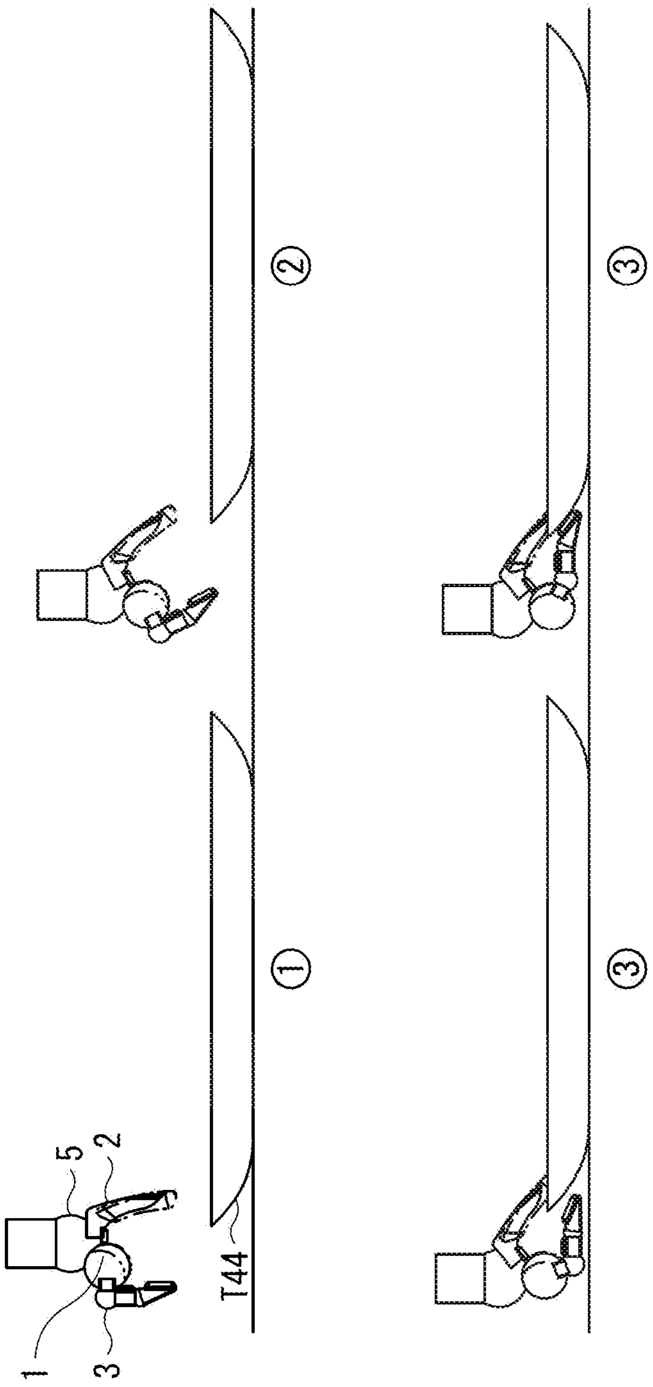

[FIG. 13A]
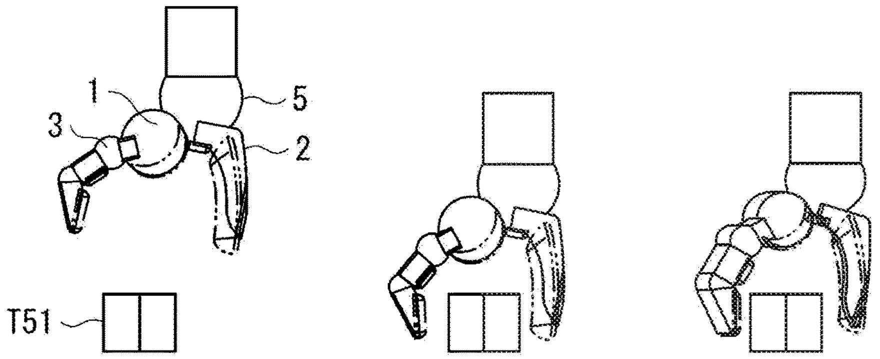
[FIG. 13B]
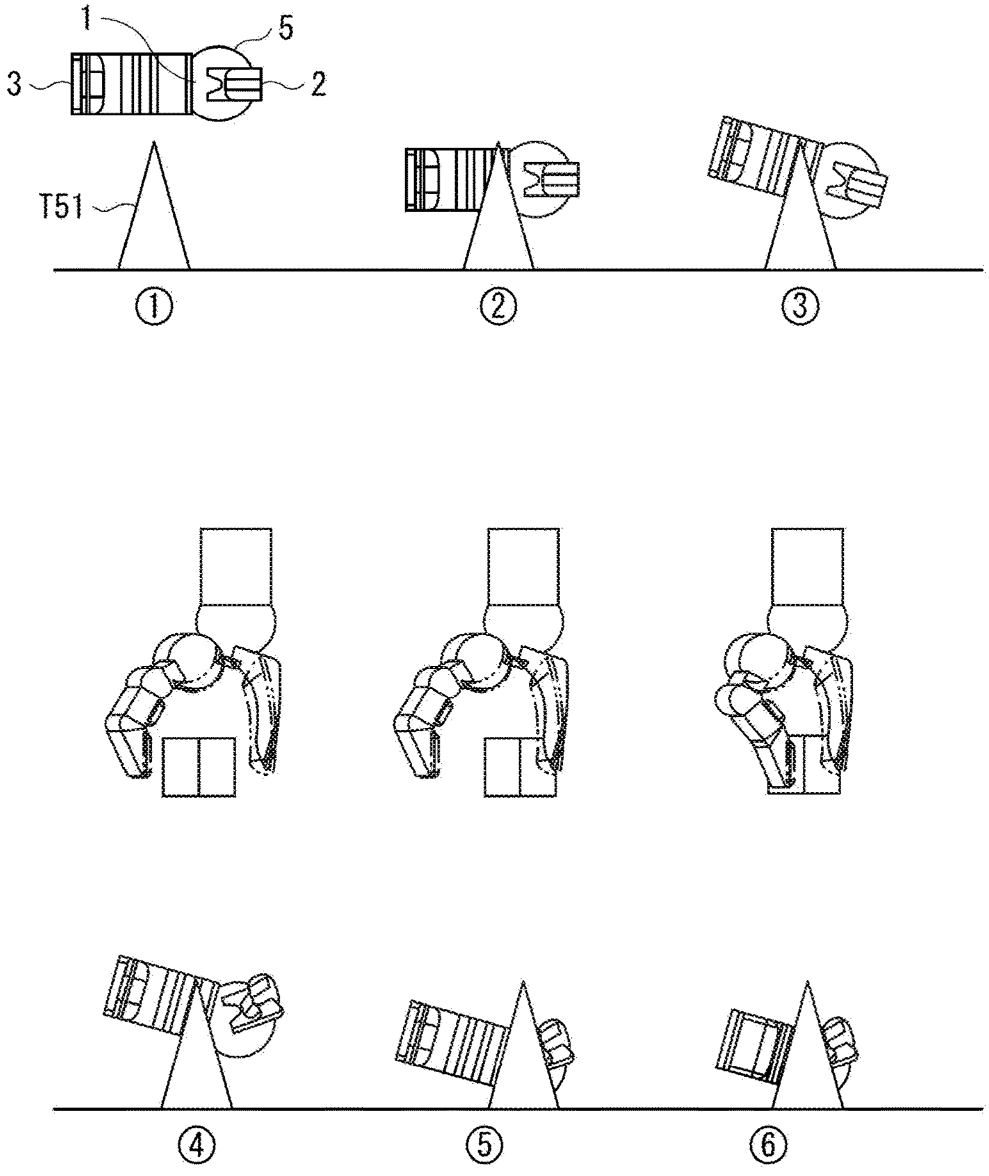

[FIG. 14A]
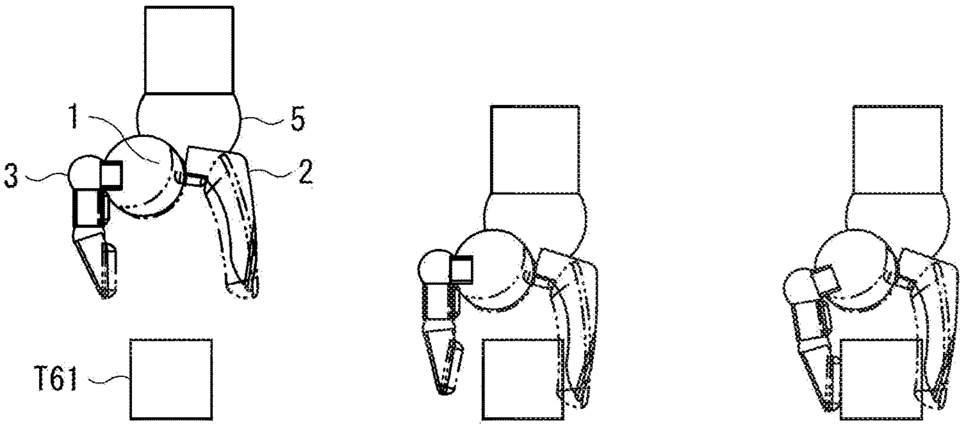
[FIG. 14B]
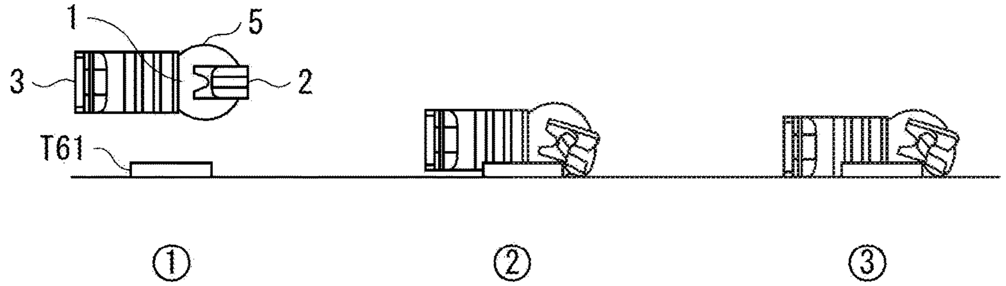

[FIG. 15A]
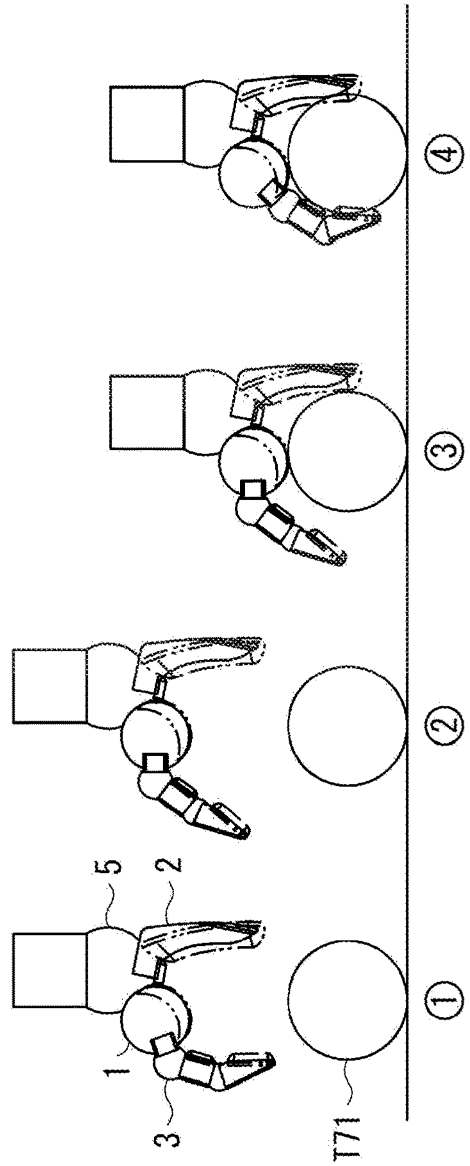
[FIG. 15B]
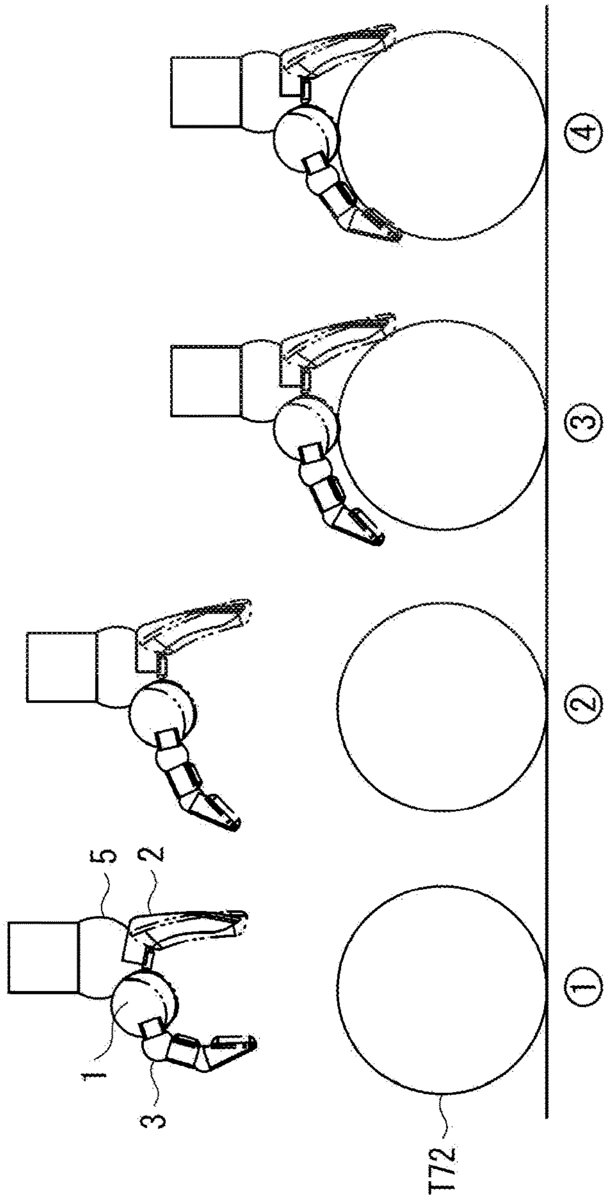

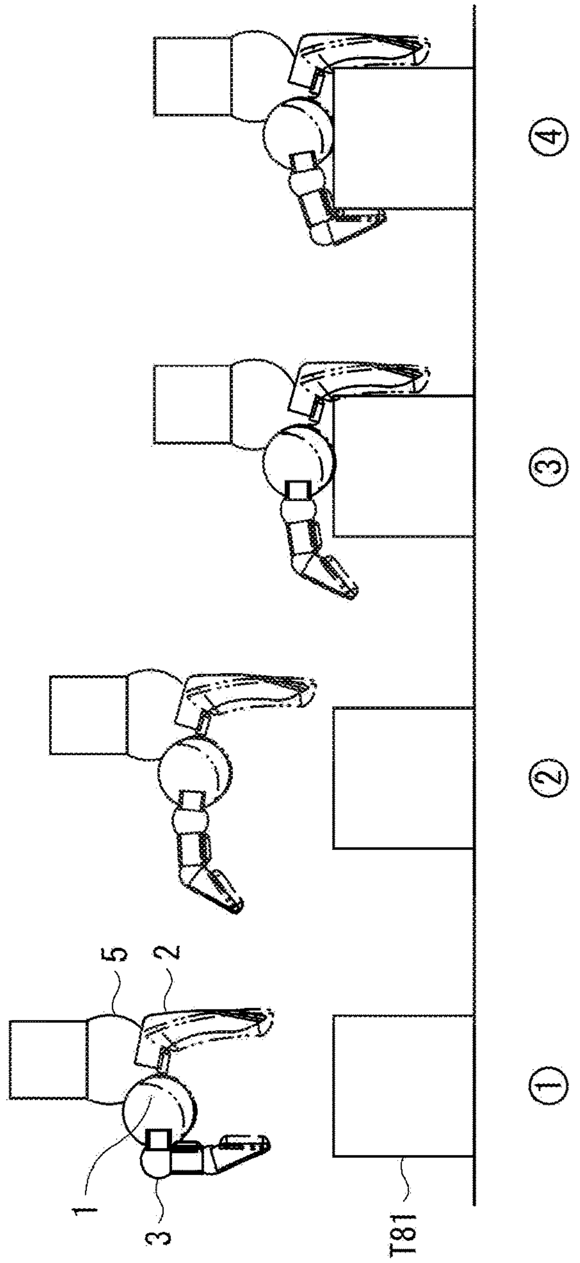
[FIG. 16]

[FIG. 17]
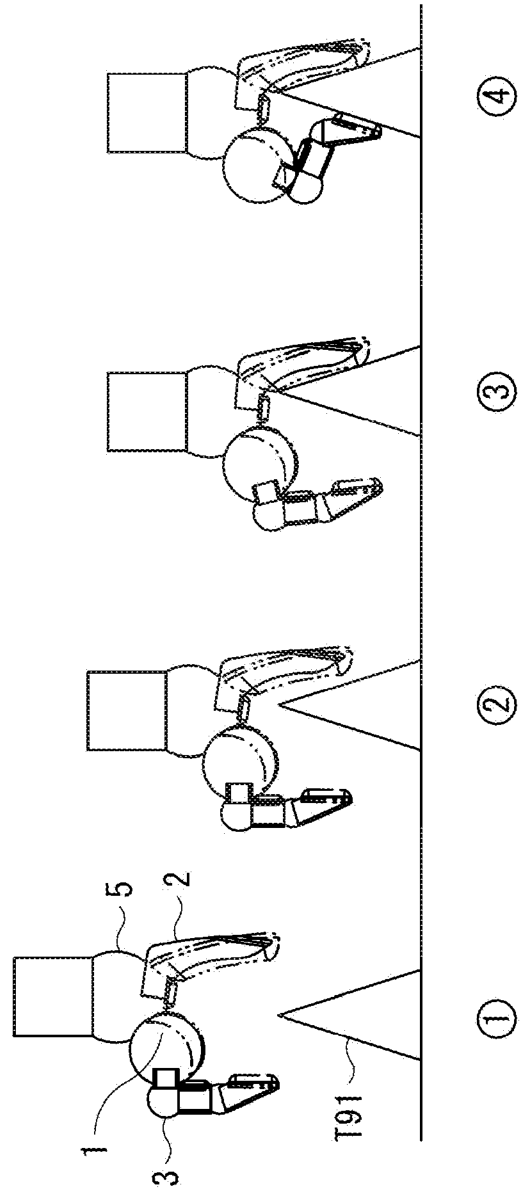

[FIG. 18]
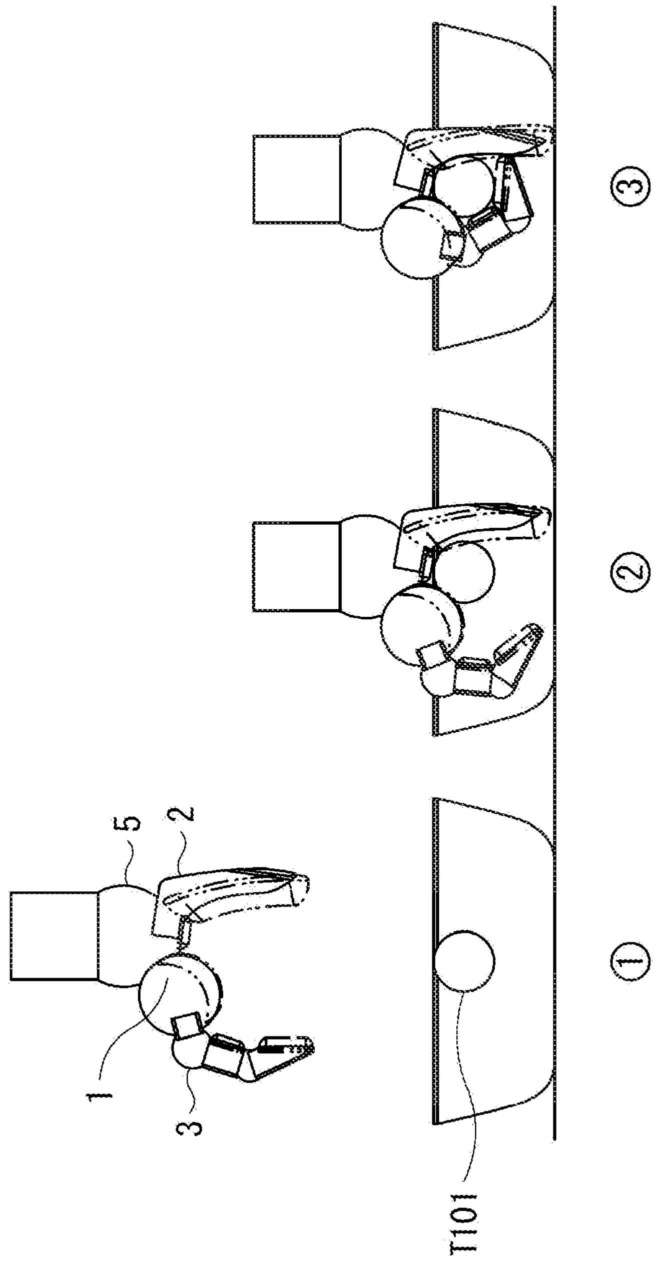

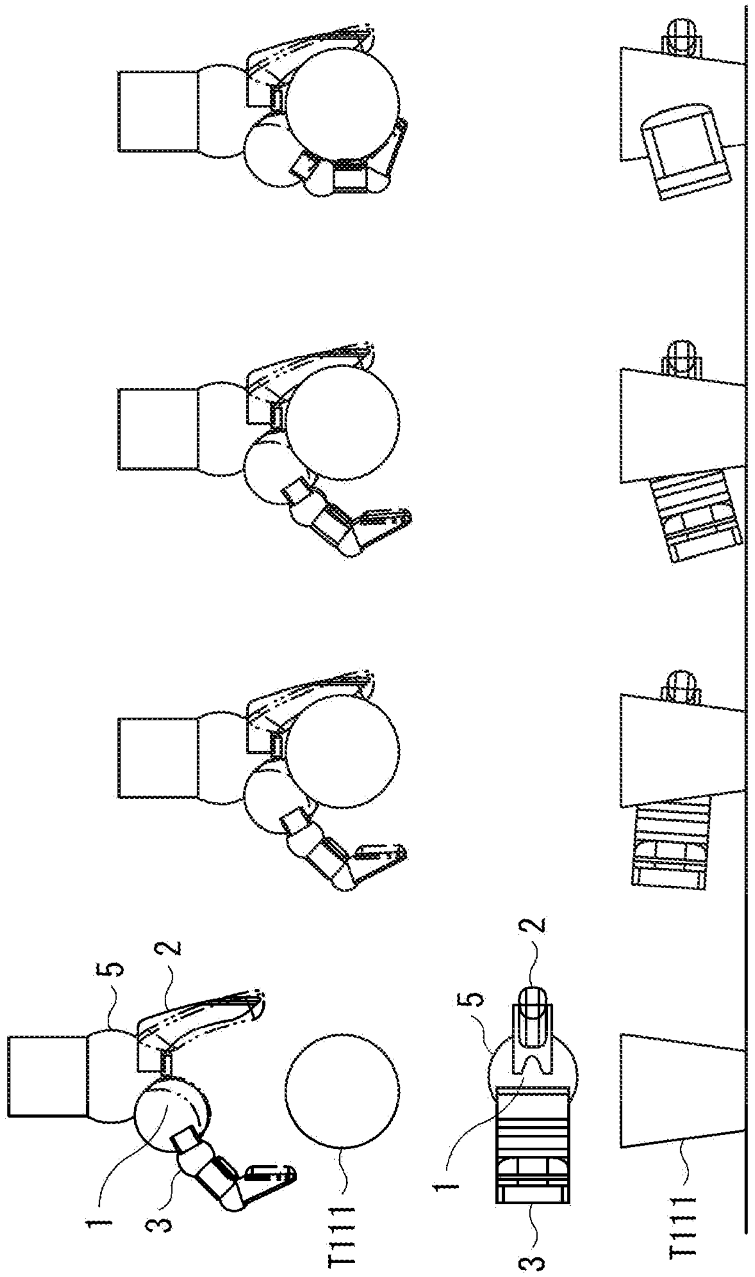
[FIG. 19]

[FIG. 20A]
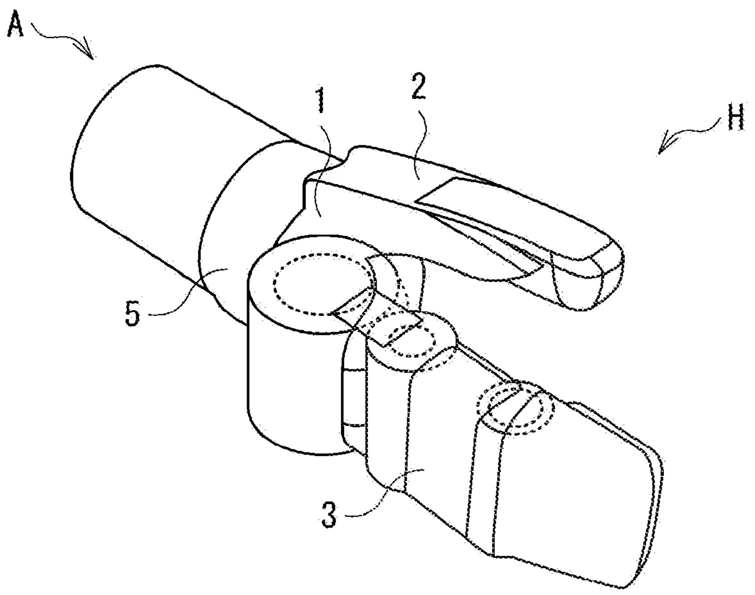
[FIG. 20B]
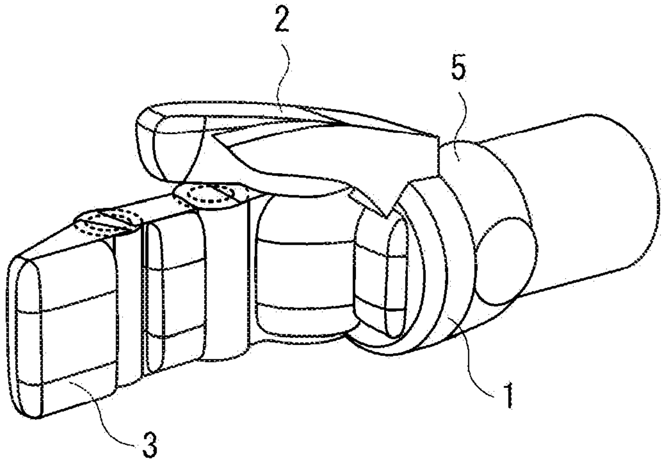

[FIG. 21]
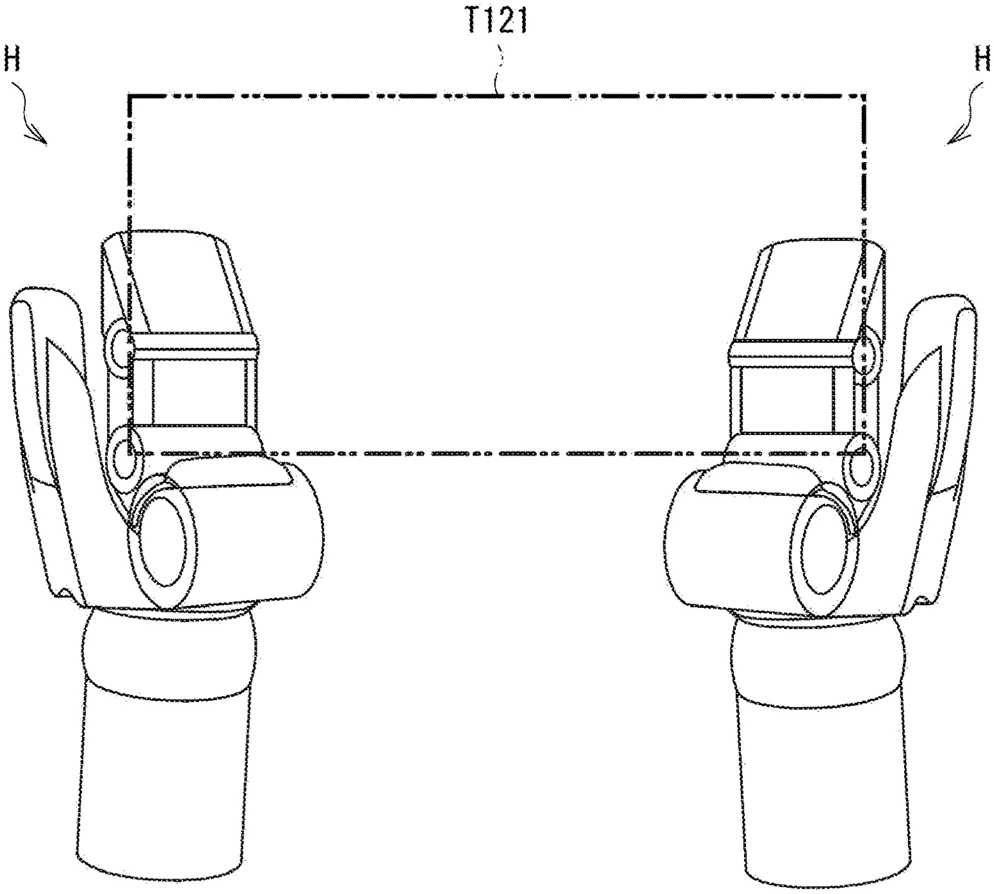

[FIG. 22]
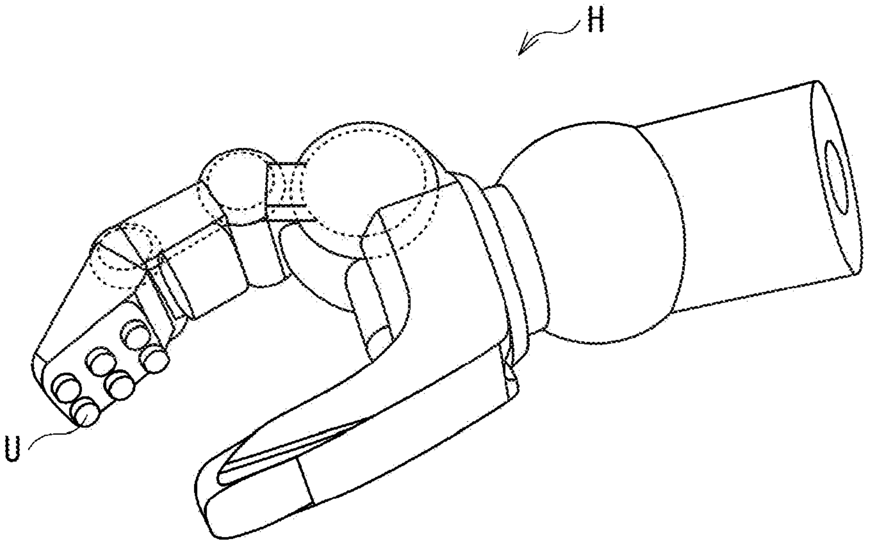
[FIG. 23]
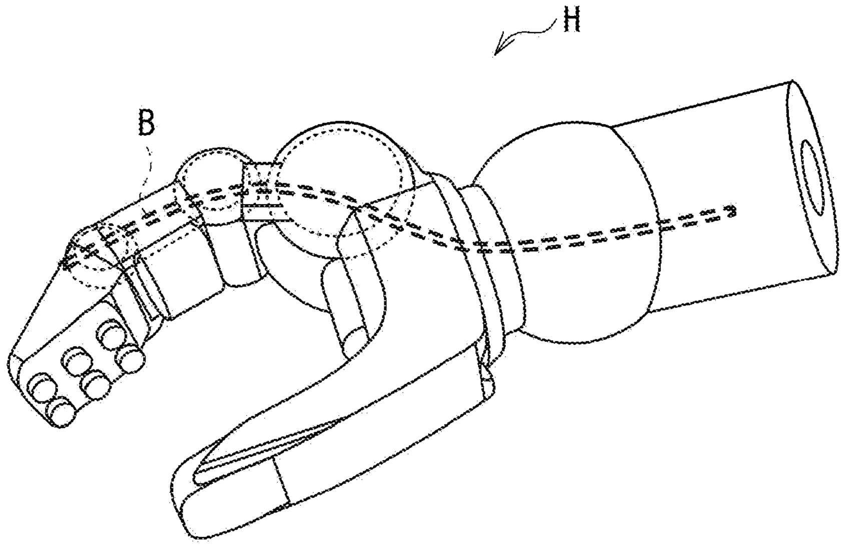

[FIG. 24]
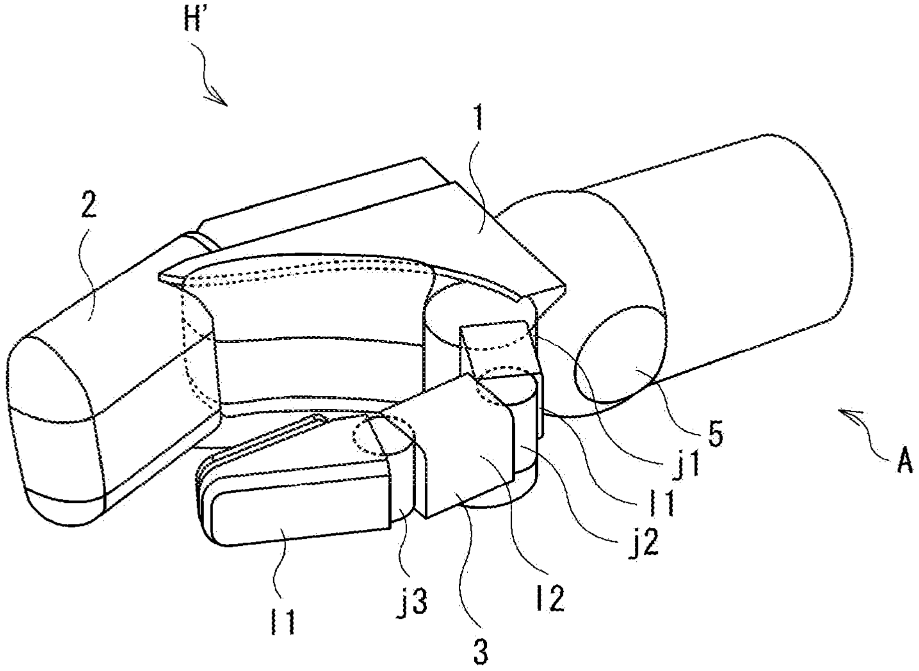

ROBOT HAND AND MANIPULATOR

CROSS REFERENCE TO RELATED APPLICATIONS

This application is a U.S. National Phase of International Patent Application No. PCT/JP2021/021279 filed on Jun. 3, 2021, which claims priority benefit of Japanese Patent Application No. JP 2020-112135 filed in the Japan Patent Office on Jun. 29, 2020. Each of the above-referenced applications is hereby incorporated herein by reference in its entirety.

TECHNICAL FIELD

The present disclosure relates to a robot hand and manipulator.

BACKGROUND ART

A robot hand including a parallel gripper and a manipulator including a parallel gripper in an effector have been already known (PTL 1).

CITATION LIST

Patent Literature

PTL 1: Japanese Unexamined Patent Application Publication No. 2017-164899

SUMMARY OF THE INVENTION

In a parallel gripper, in many cases, contact of the parallel gripper with the target object is line contact or point contact. Accordingly, in the parallel gripper, the shape of a target object that is stably grippable is limited. For stable gripping of target objects having various shapes, it is desired to make controllable the position of a contact section of the robot hand with the target object and the posture and angle of the robot hand or a finger thereof upon bringing the robot hand close to the target object. However, it is necessary to increase degrees of freedom of motion of a robot hand, which causes an issue that an increase in size of the robot hand occurs and configuration complication and an increase in weight occur.

It is desirable to provide a robot hand and a manipulator that make it possible to achieve both securing of gripping stability and suppression of increase in size.

A robot hand according to an embodiment of the present disclosure includes: a palm section; a first finger extending from the palm section to distal side, and having a finger pad surface opposed to a central axis of the palm section; and a second finger extending from the palm section to the distal side, and having a finger pad surface opposed to the finger pad surface of the first finger with the central axis of the palm section interposed therebetween. In the present embodiment, the palm section includes a proximal joint that couples the second finger to the palm section pivotably about a first axis. The first finger does not have degrees of freedom in bending and stretching directions. The second finger includes a base phalanx section provided close to the palm section, a distal phalanx section provided closer to the distal side than the base phalanx section, and a middle phalanx section provided between the base phalanx section and the distal phalanx section. Furthermore, the second finger includes a middle joint and a distal joint, the middle joint that couples the middle phalanx section to the base phalanx section bendably and strechably about a second axis, and the distal joint that couples the distal phalanx section to the middle phalanx section bendably and strechably about a third axis.

A manipulator according to an embodiment of the present disclosure is provided with an operation arm and a robot hand, the operation arm including a base end and a terminal end, and extending in an axial direction from the base end to the terminal end, and the robot hand coupled to the terminal end of the operation arm. The robot hand includes: a palm section; a first finger extending from the palm section to distal side, and having a finger pad surface opposed to a central axis of the palm section; and a second finger extending from the palm section to the distal side, and having a finger pad surface opposed to the finger pad surface of the first finger with the central axis interposed therebetween. In the present embodiment, the palm section includes a proximal joint that couples the second finger to the palm section pivotably about a first axis. The first finger does not have degrees of freedom in bending and stretching directions. The second finger includes a base phalanx section provided close to the palm section, a distal phalanx section provided closer to the distal side than the base phalanx section, and a middle phalanx section provided between the base phalanx section and the distal phalanx section. Furthermore, the second finger includes a middle joint and a distal joint, the middle joint that couples the middle phalanx section to the base phalanx section bendably and strechably about a second axis, and the distal joint that couples the distal phalanx section to the middle phalanx section bendably and strechably about a third axis.

BRIEF DESCRIPTION OF DRAWINGS

FIG. 1 is a perspective view of an appearance of a robot hand according to a first embodiment of the present disclosure.

FIGS. 2A and 2B are explanatory diagrams illustrating dimensions of respective parts of the robot hand according to the same embodiment as above.

FIGS. 3A, 3B, and 3C are diagrams illustrating the dimensions of the respective parts of the robot hand according to the same embodiment as above with changing the posture of a second finger.

FIG. 4 is a schematic diagram schematically illustrating a configuration of a control system of the same robot hand as above.

FIG. 5 is a flowchart illustrating an overall flow of a gripping operation to be performed by the robot hand according to the same embodiment as above.

FIG. 6 is a flowchart illustrating details of a gripping operation when selecting a first operation mode (same plane parallel track gripping mode) according to the same embodiment as above.

FIG. 7 is a flowchart illustrating details of a gripping operation when selecting a second operation mode (multi-point contact gripping mode) according to the same embodiment as above.

FIG. 8 illustrates an example of an operation upon gripping a columnar or spheric target object in the first operation mode.

FIGS. 9A, 9B, and 9C illustrate an example of an operation upon gripping a prismatic target object (including a thin object) in the first operation mode.

FIGS. 10A and 10B illustrate an example of an operation upon gripping an inclined-surface object or a tapered target object in the first operation mode.

FIGS. 11A, 11B, and 11C illustrate an example of an operation upon gripping a target object having a shell shape in the first operation mode.

FIG. 12 illustrates another example of the operation upon gripping a target object having a shell shape in the first operation mode.

FIGS. 13A and 13B illustrate an example of an operation upon gripping an inclined-surface object having a large height in the first operation mode.

FIGS. 14A and 14B illustrate an example of an operation upon gripping a thin object from sides in the first operation mode.

FIGS. 15A and 15B illustrate an example of an operation upon gripping a columnar or spheric target object (specifically, an object having a large diameter or a large weight) in a second operation mode.

FIG. 16 illustrates an example of an operation upon gripping a prismatic target object (specifically, an object having a large height or a large thickness) in the second operation mode.

FIG. 17 illustrates an example of an operation upon gripping an inclined-surface object (specifically, an object having a large height) in the second operation mode.

FIG. 18 illustrates an example of an operation upon gripping a columnar target object (specifically, an object having a large moment load) in the second operation mode.

FIG. 19 illustrates an example of an operation upon gripping a tapered target object from sides in the second operation mode.

FIGS. 20A and 20B illustrate an example of a state of the robot hand in a third operation mode in which a first finger is widely opened.

FIG. 21 illustrates a use example of gripping in the third operation mode.

FIG. 22 is a perspective view of a first modification example of the robot hand according to the first embodiment of the present disclosure.

FIG. 23 is a perspective view of a second modification example of the robot hand according to the first embodiment of the present disclosure.

FIG. 24 is a perspective view of an appearance of a robot hand according to a second embodiment of the present disclosure.

MODES FOR CARRYING OUT THE INVENTION

In the following, some embodiments of the present disclosure are described in detail with reference to the drawings. The following description is given of specific examples of the present disclosure, and the present disclosure is not limited to the following embodiments. Moreover, similarly, the present disclosure is not limited to positions and dimensions of respective components, and dimension ratios between components illustrated in the respective drawings.

Description is given in the following order.

1. First Embodiment
1.1. Configuration of Robot Hand
1.1.1. Entire Configuration
1.1.2. Configuration of Control System
1.2. Basic Operation of Robot Hand
1.3. Description with Flowcharts
1.4. Various Operations of Robot Hand
1.4.1. First Operation Mode (Same Plane Parallel Track Gripping Mode)
1.4.2. Second Operation Mode (Multi-Point Contact Gripping Mode)
1.4.3. Third Operation Mode
1.5. Workings and Effects
1.6. Description of Modification Examples
1.6.1. First Modification Example
1.6.2. Second Modification Example
2. Second Embodiment
3. Conclusion

1. First Embodiment

1.1. Configuration of Robot Hand

1.1.1. Entire Configuration

FIG. 1 is a perspective view of an appearance of a robot hand H according to a first embodiment of the present disclosure.

FIGS. 2A and 2B are explanatory diagrams illustrating dimensions of parts of the robot hand H according to the present embodiment, where FIG. 2A illustrates a state in which the hand robot H having a second finger 3 slightly bent is viewed in a direction perpendicular to a frontal plane including a central axis Ax0 of a palm section 1, and FIG. 2B illustrates a state in which the robot hand H having the stretched second finger 3 is viewed in a direction perpendicular to the frontal plane (an upper part) and a direction perpendicular to a horizontal plane (a lower part).

The robot hand H is mounted on a tip of an operation arm A, and configures an effector of a manipulator. In the present embodiment, the manipulator has a series type configuration, and includes the operation arm A and the robot hand H. The operation arm A includes a base end and a terminal end, and has a long shape in an axial direction from the base end to the terminal end. The base end of the operation arm A is mountable to a main body of any robot. The robot hand H is coupled to the terminal end of the operation arm A. In the present embodiment, the robot hand H includes a wrist section 5, and is rotatable about an axis parallel or perpendicular to a longitudinal axis of the operation arm A by joint motion of the wrist section 5. In the following description, side away from the base end of the operation arm A toward a fingertip section of the robot hand H is referred to as distal side, and side approaching the base end of the operation arm A from the fingertip section of the robot hand H is referred to as proximal side.

The robot hand H roughly includes the palm section 1, a first finger 2, and the second finger 3.

The palm section 1 serves as a mount that supports fingers of the robot hand H, that is, the first finger 2 and the second finger 3 that are to be described below, and determines a shortest separation distance between a base of the first finger 2 and a base of the second finger 3. In the present embodiment, the shortest separation distance is a distance formed between the base of the first finger 2 and the base of the second finger 3 in a state in which the second finger 3 is stretched in parallel to the central axis Ax0 of the palm section 1 (FIG. 2B). The palm section 1 is coupled to the wrist section 5 on the proximal side, and has a surface (hereinafter referred to as a "distal surface") 11 directed to the fingertip section on the distal side.

The first finger 2 extends from the palm section 1 to the distal side, and has a finger pad surface 21 opposed to the central axis Ax0 of the palm section 1. In the present embodiment, the central axis Ax0 of the palm section 1 coincides with the longitudinal axis of the operation arm A, and passes through the distal surface 11.

The second finger 3 extends from the palm section 1 to the distal side, and has finger pad surfaces 31*a* and 31*b* opposed to the finger pad surface 21 of the first finger 2 with the central axis Ax0 of the palm section 1 interposed therebetween. The finger pad surface 21 of the first finger 2 and the finger pad surfaces 31*a* and 31*b* of the second finger 3 serve as contact surfaces with an object targeted for gripping by the robot hand H (hereinafter referred to as a "target object"). That is, for gripping, the robot hand H makes contact with the target object with these finger pad surfaces 21, 31*a*, and 31*b* to exert grip force on the target object. In the present embodiment, the first finger 2 has the finger pad surface 21 entirely from a fingertip section to the base. In contrast, the second finger 3 has the finger pad surface 31*a* in a distal phalanx section 13 and the finger pad surface 31*b* in a middle phalanx section 12.

The robot hand H has four degrees of freedom contributing to gripping of the target object in addition to a degree of freedom given by the wrist section 5.

The robot hand H includes a proximal joint j1 in the palm section 1. The proximal joint j1 couples the second finger 3 to the palm section 1 pivotably about a first axis (which may be referred to as a first pitch axis) Ax1. The second finger 3 includes a base phalanx section (which may be referred to as a first or base phalanx link) 11 provided close to the palm section 1, a distal phalanx section (which may be referred to as a third or distal phalanx link) 13 provided closer to the distal side than the base phalanx section 11, and a middle phalanx section (which may be referred to as a second or middle phalanx link) 12 provided between the base phalanx section 11 and the distal phalanx section 13, and includes two joints j2 and j3. One of the two joints j2 and j3 is a middle joint j2 that causes the middle phalanx section 12 to be coupled to the base phalanx section 11 bendably and strechably about a second axis (which may be referred to as a second pitch axis) Ax2, and the other one is a distal joint j3 that causes the distal phalanx section 13 to be coupled to the middle phalanx section 12 bendably and strechably about a third axis (which may be referred to as a third pitch axis) Ax3. In the present embodiment, the first, second, and third axes Ax1, Ax2, and A3 are parallel to each other, and the first axis Ax1 and the central axis Ax0 of the palm section 1 have a positional relationship in which the first axis Ax1 and the central axis Ax0 three-dimensionally intersect with each other.

In contrast, the first finger 2 does not have degrees of freedom in bending and stretching directions, and is revolvable about a fourth axis (may be referred to as a yaw axis y relative to the pitch axis p) Ax4 with respect to the palm section 1. The fourth axis is coincident with or parallel to the central axis Ax0 of the palm section 1. The fourth axis Ax4 is located at a position three-dimensionally intersecting with the first axis Ax1, and is coincident with the central axis Ax0 of the palm section 1 in the present embodiment. For example, the first finger 2 is formed with use of a single link member entirely from the fingertip section to the base, which makes it possible to have a configuration having rigidity in the bending and stretching directions and having no degree of freedom.

Thus, the robot hand H has the following four degrees of freedom as degrees of freedom contributing to gripping of the target object. A first degree of freedom is one degree of freedom (a degree of freedom in a revolving direction about the fourth axis Ax4) given to the first finger 3 by the palm section 1. A second degree of freedom is one degree of freedom (a degree of freedom in a rotating direction about the first axis Ax1) given to the second finger 3 by the proximal joint j1 of the palm section 1. Third and fourth degrees of freedom are two degrees of freedom (degrees of freedom in bending and stretching directions about the second axis Ax2 and the third axis Ax3) of the middle joint j2 and the distal joint j3 of the second finger 3.

In the present embodiment, the first finger 2 has a narrower finger width than the second finger 3, and as illustrated in FIG. 2B, specifically in a case where the fingertip section of the first finger 2 is compared with the distal phalanx section I3 of the second finger 3, the fingertip section (finger width D1) of the first finger 2 is narrower than the distal phalanx section I3 (finger width D2) of the second finger 3.

Furthermore, as illustrated in FIG. 2A and the upper part of FIG. 2B, the first finger 2 has a shape in which the finger pad surface 21 is gradually separated from the central axis Ax0 of the palm section 1 toward the tip from the base of the finger pad surface 21. That is, the finger pad surface 21 of the first finger 2 has a depressed shape in which a depth is increased in a direction away from the central axis Ax0 of the palm section 1 with a straight line connecting the base and the tip of the finger pad surface 21 as a benchmark. A shape that an edge of the finger pad surface 21 of the first finger 2 draws in a cross section taken along a horizontal plane may have a planar or curved shape. Furthermore, as illustrated in FIG. 2A, the first finger 2 has an initial opening angle α that is an angle formed between the straight line connecting the base and the tip of the finger pad surface 21 and a reference line parallel to the central axis Ax0 of the palm section 1. The initial opening angle α is preferably within a range from 10 degrees to 60 degrees, and is 30 degrees in the present embodiment. The first finger 2 having the initial opening angle α makes it easy to adjust an angle of the finger pad surface 21 of the first finger 2 with respect to the target angle upon gripping.

In the present embodiment, in addition to the above degrees of freedom, the following two degrees of freedom are set as degrees of freedom by the wrist section 5. The two degrees of freedom include one degree of freedom in a rotating direction about the central axis (that is, the yaw axis y) of the palm section 1, and one degree of freedom in a swinging direction about an axis (that is, the pitch axis p) parallel to the first axis Ax1. Thus, it is possible for the robot hand H to apply a twist to the operation arm A by the wrist section 5, and it is possible to swing the entire robot hand H with the wrist section 5 as a starting point. It is possible to give a degree of freedom in a swinging direction about a roll axis r perpendicular to the central axis Ax0 of the palm section 1 in place of or in addition to the degree of freedom about the pitch axis p.

The robot hand H includes the number of actuators corresponding to the degrees of freedom in the wrist section 5, and includes an actuator for each of the palm section 1 (including the proximal join j1), and the middle joint j2 and the distal joint j3 of the second finger 3. In the present embodiment, the proximal joint j1 has a larger diameter than each of the middle joint j2 and the distal joint j3, and as an actuator included in the proximal joint j1, it is possible to adopt an actuator having a larger output than actuators included in the middle joint j2 and the distal joint j3. Examples of an applicable actuator may include an electric motor, and it is possible to adopt, for the proximal joint j1, an electric motor that is able to output a higher torque than those for the middle joint j2 and the distal joint j3.

In the present embodiment, a control unit 101 configured as an electronic control device is provided, and operations of the actuators are controlled by the control unit 101, which makes it possible to control a posture and an operation of the robot hand H upon gripping the target object. A control system including the control unit 101 is described in more detail later.

FIGS. 3A, 3B, and 3C are diagrams illustrating dimensions of respective parts of the robot hand H according to the present embodiment with changing a posture of the second finger 3. FIG. 3A illustrates a state in which the proximal joint j1 has an intermediate opening degree, the middle joint j2 is stretched, and the distal joint j3 is bent. FIG. 3B illustrates a state in which the proximal joint j1 has a maximum opening degree, an angle of the base phalanx section I1 of the second finger 3 relative to the first finger 2 is widened to maximum, the middle joint j2 is bent, and the distal joint j3 is stretched. FIG. 3C illustrates a state in which the proximal joint j1 has a minimum opening degree, the angle of the base phalanx section 11 of the second finger 3 relative to the first finger 2 is narrowed to minimum, and both the middle joint j2 and the distal joint j3 are stretched. In FIGS. 3A and 3B, the fingertip section of the first finger 2 and the distal phalanx section I3 of the second finger 3 are located on the same plane as each other, and in FIG. 3C, the straight line connecting the base and the tip of the finger pad surface 21 of the first finger 2 and a straight line parallel to the finger pad surfaces 31*a* and 31*b* of the middle phalanx section I2 and the distal phalanx section I3 of the second finger 3 form an angle equal to the initial opening angle α. In the present embodiment, in a case where a tip of the fingertip section of the first finger 2 and a tip of the distal phalanx section I3 of the second finger 3 are located on the same plane, it is considered that "the fingertip section of the first finger 2 and the distal phalanx section 13 of the second finger 3 are located on the same plane". As a part serving as a reference upon determining whether or not being located on the same plane, it is possible to adopt a part that makes first contact with the target object upon gripping in place of the tip of the fingertip section or the distal phalanx section I3. The configuration of the robot hand H is further described with reference to FIGS. 3A, 3B, and 3C.

The respective dimensions illustrated in FIGS. 3A, 3B, and 3C are as follows. L1 is a length in a direction along the finger pad surface of the base phalanx section I1 from the center of the proximal joint j1 to the center of the middle joint j2. L2 is a length in a direction along the finger pad surface 31*b* of the middle phalanx section 12 from the center of the middle joint j2 to the center of the distal joint j3. L3 is a length in a direction along the finger pad surface 31*a* of the distal phalanx section I3 from the center of the distal joint j3 to a tip of the second finger 3, that is, the tip of the distal phalanx section 13 of the second finger 3. L4 is a length of the first finger 2, and is determined in a direction parallel to the central axis Ax0 (FIG. 2B) of the palm section 1. L5 is a spacing formed between the center of the distal joint j3 and the tip of the first finger 2, that is, the tip of the fingertip section of the first finger 2 in a state in which both the middle joint j2 and the distal joint j3 of the second finger 3 are stretched, and indicates a width of the distal surface 11 of the palm section 1. L6 is a spacing formed between the tip of the first finger 2 and the tip of the second finger 3 in a state illustrated in FIG. 3A, and corresponds to a maximum horizontal width dimension of the target object grippable in a first operation mode (same parallel track gripping mode) to be described later. L7 is a height from the tip of the first finger 2 to the palm section 1 or the distal surface 11 of the palm section 1, and corresponds to a maximum height dimension of the target object grippable in the first operation mode. L8 is a diameter of the distal joint j3, and L9 is a diameter of the wrist section. Here, the dimensions L3, L7, and L8 establish a relationship represented by the following expression (1) as a condition that enables an operation in the first operation mode. In the present embodiment, the proximal joint j1 is included in the palm section 1; therefore, the distal surface 11 of the palm section 1 extends from a portion adjacent to a root of the first finger 2 to a portion of a side surface of the proximal joint j1. In the present embodiment, lengths L1, L2, and L3 of the respective phalanx sections 11, 12, and 13 are equal to each other (the following expression (2)). Furthermore, in the present embodiment, the distal phalanx section I3 of the second finger 3 has a tapered shape of which the thickness is decreased toward the distal side.

$$L3 + L8/2 \leq L7 \quad (1)$$

$$L1 = L2 = L3 \quad (2)$$

1.1.2 Configuration of Control System

FIG. 4 is a schematic diagram schematically illustrating a configuration of a control system S of the robot hand H according to the present embodiment.

The control system S roughly includes the control unit 101 (FIG. 1), various sensors 201 to 204, and various actuators ACT. As described above, the actuators ACT include an electric motor included in a movable section such as a joint of the robot hand H.

The sensors 201 to 204 are disposed at different parts of the robot hand H, and are used to grasp a positional relationship between the robot hand H and the target object and detect contact of the robot hand H with the target object.

The sensor 201 is provided in the palm section 1, and is able to detect the position of the target object relative to the palm section 1 and detect contact of the target object with the distal surface 11 of the palm section 1. Examples of a sensor applicable to the sensor 201 may include a tactile sensor and a proximity sensor, and it is possible to use a visual sensor or a camera as a substitute.

The sensor 202 is provided in the first finger 2, and detects contact of the target object with the finger pad surface 21 of the first finger 2. Examples of a sensor applicable to the sensor 202 may include a tactile sensor and a proximity sensor.

The sensor 203 is provided in the middle phalanx section 12 of the second finger 3, and detects contact of the target object with the finger pad surface 31*b* of the middle phalanx section 12. Examples of a sensor applicable to the sensor 203 may include a tactile sensor and a proximity sensor.

The sensor 204 is provided in the distal phalanx section 13 of the second finger 3, and detects contact of the target object with the finger pad surface 31*a* of the distal phalanx section 13. Examples of a sensor applicable to the sensor 204 may include a tactile sensor and a proximity sensor.

In the present embodiment, the sensor 204 provided in the distal phalanx section 13 has higher resolution than the sensor provided in the middle phalanx section 12, but has a low load range. This is because of a difference in use of sensor output upon gripping the target object. In the first operation mode (same plane parallel track gripping mode) to be described later, a relatively small and light object is a target for gripping, and the high-resolution sensor 204 included in the distal phalanx section 13 is used to control grip force of the robot hand H. In contrast, in the second operation mode (multi-point contact gripping mode), a relatively large and heavy object is a target for gripping, and the high-load range sensor 203 included in the middle phalanx section 12 is used to control the grip force of the robot hand H. Thus, in the present embodiment, a sensor to be used for control of the grip force is switched between the sensors 203 and 204 depending on the size, shape, and the like of the target object.

It is possible to provide a sensor in the base phalanx section 11 in addition to the middle phalanx section 12 and the distal phalanx section 13 of the second finger 3 and use the sensor for control of the actuator ACT upon gripping the target object.

As one example, the control unit 101 is configured as a microcomputer that includes a central processing unit (CPU) including a processor and the like, various storage devices such as a ROM or a RAM, an input/output interface, and the like, and receives detection signals inputted from the sensors 201 to 204 and executes an operation in accordance with a command of a predetermined program on the basis of inputted sensor signals. A command signal obtained as a result of the operation is then outputted to a driving unit of the actuator ACT.

In the present embodiment, the control unit 101 determines the target object, and selects an operation mode between the first operation mode, that is, the same plane parallel track gripping mode, and the second operation mode, that is, the multi-point contact gripping mode in accordance with the determined target object. The control unit 101 then controls the operation of the robot hand H upon gripping the target object in the selected operation mode. Here, the second operation mode is selected upon gripping a relatively large target object, and is characterized as an operation mode in which contact areas of the finger pad surfaces 21, 31*a*, and 31*b* of the first finger 2 and the second finger 3 with the target object are wider than in the first operation mode. In the present embodiment, switching of the contact areas is caused by changing parts to be brought into contact with the target object upon gripping, of the palm section 1, the first finger 2, and the second finger 3. The control unit 101 roughly includes a target object determining unit 111, an operation mode selector 121, and a hand controller 131.

The target object determining unit 111 determines the target object. In the present embodiment, determination of the target object includes determination of the size, shape, material, and the like of the target object. Determination of the target object is achievable by creating a list in which information about the sizes, shapes, materials, and the like of target objects is determined in advance, and storing the list in the control unit 101, and is also achievable by providing a camera to be capable of photographing the target object, and determining the type or attribute of the target object on the basis of image data or the like obtained by the camera.

The operation mode selector 121 selects the operation mode between the first operation mode and the second operation mode in accordance with the target object determined by the target object determining unit 111.

Specifically, the operation mode selector 121 compares a dimension of the target object with a preset reference dimension, and in a case where the dimension of the target object is smaller than the reference dimension, the operation mode selector 121 selects the first operation mode. In contrast, in a case where the dimension of the target object is larger than the reference dimension, the operation mode selector 121 selects the second operation mode. As described above, the second operation mode is an operation mode in which contact areas of the finger pad surfaces 21, 31*a*, and 31*b* of the robot hand H with the target object are wider than in the first operation mode.

The reference dimension is, for example, a possible maximum value of a distance between an end of the fingertip section of the first finger 2 and an end of the distal phalanx section I3 of the second finger 3 in a state in which the fingertip section of the first finger 2 and the distal phalanx section I3 of the second finger 3 are located on the same plane perpendicular to the central axis Ax0 of the palm section 1. The reference dimension in this case is given as a dimension indicated by the sign L6 in FIG. 3A.

Alternatively, the reference dimension may be a distance determined in a direction parallel to the central axis Ax0 of the palm section 1 between the tip of the first finger 2 and the distal surface 11 of the palm section 1. The reference dimension in this case is given as a dimension indicated by the sign L7 in FIGS. 3A and 3B.

In the present embodiment, the operation mode selector 121 selects the first operation mode in a case where the horizontal width dimension of the target object is smaller than a first reference dimension L6 and the height dimension of the target object is smaller than a second reference dimension L7, and selects the second operation mode in a case where the horizontal width dimension of the target object is larger than the first reference dimension L6 or the height dimension of the target object is larger than the second reference dimension L7.

The hand controller 131 controls the operation of the robot hand H upon gripping the target object in the operation mode selected by the operation mode selector 121.

1.2. Basic Operation of Robot Hand

As described above, distinction between the first operation mode and the second operation mode is made in a contact area formed between the target object and the robot hand H upon gripping, and the first operation mode is characterized as an operation mode of a relatively small contact area, and the second operation mode is characterized as an operation mode of a relatively large contact area. Furthermore, in the present embodiment, magnitude of grip force to be exerted on the target object by the robot hand H differs between the first operation mode and the second operation mode, and the positions and characteristics of the sensors 203 and 204 used for control of the grip force, that is, resolutions and load ranges of the sensors are changed in accordance with this.

FIG. 8 illustrates an example of an operation of the robot hand H upon gripping a columnar or spheric target object T11 in the first operation mode. In description of the example in FIG. 8, in the first operation mode, the robot hand H is appropriately disposed with respect to the target object T11, specifically, the fingertip section of the first finger 2 and the distal phalanx section 13 of the second finger 3 are adjusted roughly to the height of the center of gravity of the target object T11, and thereafter, the fingertip section of the first finger 2 is brought close to the target object to bring the finger pad surface 21 of the first finger 2 into contact with a side surface disposed at the height of the center of gravity of the target object. In the first operation mode, contact by the first finger 2 is first contact of the robot hand H with the target object, and at the time of this contact, the distal surface 11 of the palm section 1 is not in contact with the target object, and space remains between the target object and the palm section 1. Thereafter, the distal phalanx section 13 of the second finger 3 is brought close to the target object T11 to bring the finger pad surface 31*a* of the distal phalanx section 13 of the second finger 3 into contact with a side surface of the target object on side opposite to the side surface in contact with the finger pad surface 21 of the fingertip section of the first finger 2. Here, in the first operation mode, upon bringing the distal phalanx section 13 of the second finger 3 close to the target object T11, the distal joint j3 is activated as appropriate to move the distal phalanx section 13 of the second finger 3 so that the tip of the distal phalanx section 13 maintains a track on the same plane P. In other words, in the first operation mode, while the distal phalanx section 13 of the second finger 3 is brought close to the target object T11, the tip of the distal phalanx section 13 and the tip of the fingertip section of the first finger 2 are always located on the same plane P. After the finger pad surface 31*a* of the distal phalanx section 13 of the second finger 3 is brought into contact with the target object, grip force by the robot hand H is exerted on the target object to grip the target object.

FIGS. 15A and 15B illustrate an example of an operation of the robot hand H upon gripping a columnar or spheric target object (specifically, an object having a large diameter or a large weight) T71 or T72 in the second operation mode. In description of the example in FIGS. 15A and 15B, in the second operation mode, the robot hand H is brought close to the target object T71 or T72 to bring the distal surface 11 of the palm section 1 into contact with the target object T71 or T72. In the second operation mode, this contact by the palm section 1 is first contact of the robot hand H with the target object T71 or T72. Thereafter, the fingertip section of the first finger 2 is brought close to the target object T71 or T72 to bring the finger pad surface 21 of the first finger 2 into contact with a side surface located roughly at the height of the center of gravity of the target object T71 or T72. After the contact by the first finger 2, the second finger 3 is brought close to the target object T71 or T72 to bring the finger pad surface 31*b* of the middle phalanx section I2 and the finger pad surface 31*a* of the distal phalanx section I3 into contact with the side surface of the target object T71 or T72 in this order. Here, in the second operation mode, not only the fingertip section of the first finger 2 and the distal phalanx section I3 of the second finger 3 but also the palm section 1 and the middle phalanx section I2 of the second finger 3 are involved in gripping of the target object T71 or T72 or production of grip force to thereby achieve multi-point contact with the target object T71 or T72 and increase a contact area. After the finger pad surfaces 31*a* and 31*b* of the middle phalanx section I2 and the distal phalanx section I3 of the second finger 3 are brought into contact with the target object T71 or T72, the grip force by the robot hand H is exerted on the garget object to grip the target object.

The above operation is a basic operation to be performed by the robot hand H upon gripping the target object. In the present embodiment, in addition to the above-described modes, the following two modes are adopted as derivative modes classified into the first operation mode and the second operation mode.

One of the modes is a derivative mode in a case where an object having an inclined side surface or a tapered shape is a target for gripping, and is classified into the first operation mode. Specifically, in advance of bringing the finger pad surface 31*a* of the distal phalanx section I3 of the second finger 3 into contact with the target object, the first finger 2 is revolved about the fourth axis Ax4 to bring the orientation of the finger pad surface 21 of the first finger 2 close to the orientation of the side surface of the target object, thereby matching inclination of the finger pad surface 21 to inclination of the side surface of the target object. FIGS. 13A and 13B illustrate an operation of the robot hand H upon gripping an inclined-surface object T51 having a large height in the first operation mode as an example of the derivative mode.

The other mode is a derivative mode in a case where an object having a narrow horizontal width W or a small height H but having a large moment load (e.g., an object like a handle of a frying pan or a rod having a long tip) is a target for gripping, and is classified into the second operation mode. Specifically, the distal surface 11 of the palm section 1 is brought into contact with the target object, and the finger pad surface 21 of the first finger 2 is further brought into contact with the target object, and thereafter, the proximal joint j1 is rotated, and the middle joint j2 and the distal joint j3 are bent. Thus, the second finger 3 is closed to surround the target object by the second finger 3, thereby exerting grip force. This is a generally known gripping form as a form closure. FIG. 18 illustrates an operation of the robot hand H upon gripping a columnar target object (specifically, an object having a large moment load) T101 as an example of the derivative mode.

1.3. Description with Flowcharts

FIG. 4 is a flowchart illustrating an overall flow of a gripping operation to be performed by the robot hand H according to the first embodiment of the present disclosure. FIG. 5 is a flowchart illustrating details of a gripping operation when selecting the first operation mode (same plane parallel track gripping mode) according to the present embodiment. FIG. 6 is a flowchart illustrating details of a gripping operation when selecting the second operation mode (multi-point contact gripping mode) according to the present embodiment. Operations illustrated in FIGS. 4 to 6 are controlled by the control unit 101, and are executed every time an object (target object) targeted for gripping is specified.

In S101, a target object 101 is recognized.

In S102, dimensions of the target object 101 are obtained. In the present embodiment, a horizontal width dimension W of a part, on which grip force is to be exerted by the robot hand H, of the target object, and a height dimension H of the target object are obtained.

In S103, whether or not a load applied from the target object upon gripping is within a range of a standard load is determined. In a case where the load is within the range of the standard load, the flow proceeds to S104, and in a case where the load is not within the range of the standard load, the flow proceeds to S107. It is possible to determine the standard load as the weight of the target object or a moment load applied from the target object to the robot hand H.

In S104, whether or not the horizontal width dimension W of the target object is equal to or smaller than the first reference dimension L6 is determined. In a case where the horizontal width dimension W is equal to or smaller than the first reference dimension L6, the flow proceeds to S105, and in a case where the horizontal width dimension W exceeds the first reference dimension L6, the flow proceeds to S107.

In S105, whether or not the height dimension H of the target object is equal to or smaller than the second reference dimension L7 is determined. In a case where the height dimension H is equal to or smaller than the second reference dimension L7, the flow proceeds to S106, and in a case where the height dimension H exceeds the second reference dimension L7, the flow proceeds to S107.

In S106, as the operation mode of the robot hand H, the first operation mode is selected.

In S107, as the operation mode of the robot hand H, the second operation mode is selected.

In a case where the first operation mode is selected, the flow proceeds to the flowchart illustrated in FIG. 5, and the target object is gripped in the first operation mode.

In S201, the fingertip section of the first finger 2 is adjusted roughly to the height of the center of gravity of the target object, and the angle of the fingertip section of the first finger 2 is adjusted to make the finger pad surface 21 of the first finger 2 roughly parallel to a side surface of the target object. This adjustment is enabled mainly by an operation of the wrist section 5.

In S202, the fingertip section of the first finger 2 is brought close to the target object to bring the finger pad surface 21 of the first finger 2 into contact with a side surface disposed at the height of the center of gravity of the target object.

In S203, the angle of a side surface of the target object on side opposite to the side surface in contact with the finger pad surface 21 of the first finger 2 is measured.

In S204, the angle of the distal phalanx section 13 of the second finger 3 is adjusted close to the measured angle. This adjustment is made by appropriately operating the proximal joint j1, the middle joint j2, and the distal joint j3. Thereafter, while the distal phalanx section 13 is moved so as to maintain the adjusted angle of the distal phalanx section 13, the distal phalanx section 13 of the second finger 3 is brought close to the target object. Here, if necessary, it is possible to assist an operation of maintaining the angle of the distal phalanx section 13 by relatively rotating the first finger 2 about the fourth axis Ax4.

In S205, the finger pad surface 31*a* of the distal phalanx section 13 of the second finger 3 is brought into contact with the side surface of the target object on the opposite side.

In S206, grip force by the robot hand H is exerted on the target object to complete gripping.

In a case where the second operation mode is selected, the flow proceeds to the flowchart illustrated in FIG. 6, and the target object is gripped in the second operation mode.

In S301, the second finger 3 is outwardly rotated about the first axis Ax1 by an operation of the proximal joint 11 to expand an opening formed between the first finger 2 and the second finger 3 to such an extent that an object targeted for gripping is receptible.

In S302, the robot hand H is brought close to the target object to bring the distal surface 11 of the palm section 1 into contact with the target object.

In the following S202 and subsequent steps, operations similar to those in S202 to S206 in the first operation mode are performed. That is, the fingertip section of the first finger 2 is brought close to the target object to bring the finger pad surface 21 of the first finger 2 into contact with the side surface located at the height of the center of gravity of the target object (S202). The angle of the side surface of the target object on side opposite to the side surface in contact with the finger pad surface 21 of the fingertip section of the first finger 2 is measured (S203). The angle of the distal phalanx section 13 of the second finger 3 is adjusted close to the measured angle, and the distal phalanx section 13 of the second finger 3 is brought close to the target object while maintaining the adjusted angle of the distal phalanx section 13 (S204). The finger pad surface 31*a* is brought into contact with the side surface of the target object on the opposite side (S205). Furthermore, grip force on the target object is produced (S206). Thus, gripping is completed.

1.4. Various Operations of Robot Hand

Examples of gripping of specific target objects in the first operation mode and the second operation mode are described below.

1.4.1. First Operation Mode (Same Plane Parallel Track Gripping Mode)

FIG. 8 illustrates an example of an operation in the first operation mode in a case where the columnar or spheric object T11 is a target for gripping. The finger pad surface 21 of the fingertip section of the first finger 2 is brought into contact with a side surface around the height of the center of gravity of the target object, and the distal phalanx section 13 of the second finger 3 is brought close to the target object T11 along a track on the same plane P to bring the finger pad surface 31*a* of the distal phalanx section 13 of the second finger 3 into contact with a side surface on side opposite to the finger pad surface 21.

FIGS. 9A, 9B, and 9C illustrate an example of an operation in the first operation mode in a case where FIG. 9A a prismatic object T21, FIG. 9B a fine object T22 of which a side has a small dimension, and FIG. 9C a thin object T23 having a small thickness are targets for gripping. The operation of the robot hand H in this case is similar to that illustrated in FIG. 8; however, specifically in gripping of the fine object T22 and the thin object T23 illustrated in FIGS. 9B and 9C, it is possible to keep the state of the wrist section 5 fixed, thereby keeping low a manipulation load of the entire manipulator including the operation arm A.

FIGS. 10A and 10B illustrate an example of an operation in the first operation mode in a case where FIG. 10A an inclined-surface object having an inclined side surface (e.g., a triangular prism or quadrangular prism having a small height) T31 and FIG. 10B an object having a tapered side surface (e.g., a cup-like object) T32 are targets for gripping. The operation of the robot hand H in this case is characterized in that a rotation angle given by the distal joint j3 upon bringing the distal phalanx section I3 of the second finger 3 close to the target object T31 or T32 is large.

FIGS. 11A, 11B, and 11C illustrate an example of an operation in the first operation mode in a case where FIG. 11A a cylindrical object T41, FIG. 11B a dish-shaped object T42 having a large depth, and FIG. 11C a bowl-shaped object T43 having a tapered side surface are targets for gripping as objects having a shell shape. FIG. 12 illustrates an example of an operation in the first operation mode in a case where a dish-shaped object T44 having a small depth (that is, having a shallow depth) is a target for gripping as another object having a shell shape. In the present embodiment, the shell shape is a shape of a thinly formed cylinder, inverted cone, truncated inverted cone, hemisphere, or the like, and, for example, shapes of a cup, dishes having various sizes, a small bowl, a bowl, and the like correspond to the shell shape. The finger pad surface 21 of the fingertip section of the first finger 2 is brought into contact with the target object T41, T42, T43, or T44 having the shell shape in a state in which the angle of the finger pad surface 21 of the fingertip section of the first finger 2 is adjusted to an inner surface of a shell in proximity to an upper edge, and the finger pad surface 31*a* of the distal phalanx section I3 of the second finger 3 is brought into contact with an outer surface of the shell around the height of the center of gravity of the target object, thereby gripping the target object so as to pinch the edge of the target object.

FIGS. 13A and 13B illustrate an example of an operation in the first operation mode in a case where an inclined-surface object T51 having a large height (e.g., a triangular prism having a bottom surface with two longer sides than another side or a quadrangular pyramid having a large height) is a target for gripping. The robot hand H is laid, and is brought close to the target object T51 from sides. The angle of the fingertip section of the first finger 2 is adjusted by relative rotation about the fourth axis Ax4 of the first finger 2, and the finger pad surface 21 of the fingertip section of the first finger 2 is brought into contact with a side surface of the target object T51. Thereafter, while the distal phalanx section I3 is maintained at the adjusted angle by an operation of the distal joint j3, the distal phalanx section I3 of the second finger 3 is brought close to a side surface on opposite side around the height of the center of gravity of the target object T51 to bring the finger pad surface 31*a* of the distal phalanx section I3 of the second finger 3 into contact with the side surface on the opposite side.

FIGS. 14A and 14B illustrate an example of an operation in the first operation mode in a case where a thin object T61 having a small thickness is a target for gripping. An operation of the robot hand H in this case is similar to that illustrated in FIGS. 13A and 13B, and upon gripping, the robot hand H is laid, and is brought close to the target object T61 from sides. An operation after the finger pad surface 21 of the fingertip section of the first finger 2 is brought into contact with a side surface of the target object is characterized in that upon bringing the distal phalanx section I3 of the second finger 3 close to a side surface on opposite side of the target object T61, a track on the same plane is maintained by a side surface or a side edge of the fingertip section of the first finger 2 and a side surface or a side edge of the distal phalanx section I3 of the second finger 3.

1.4.2. Second Operation Mode (Multi-Point Contact Gripping Mode)

FIGS. 15A and 15B illustrate an example of an operation in the second operation mode in a case where the columnar or spheric target object (specifically, an object having a large diameter or a large weight) T71 or T72 is a target for gripping. The distal surface 11 of the palm section 1 is brought close to the target object T71 or T72 in a state in which fingers of the robot hand H are opened by an operation of the proximal joint j1 to be brought into contact with the target object T71 or T72. Thereafter, the finger pad surface 21 of the fingertip section of the first finger 2 is brought into contact with a side surface of the target object T71 or T72, and the second finger 3 is brought into contact with a side surface on the opposite side of the target object T71 or T72 in order of the finger pad surface 31*b* of the middle phalanx section I2 and the finger pad surface 31*a* of the distal phalanx section I3. On this occasion, it is more preferable that the finger pad surface 21 of the fingertip section of the first finger 2 and the finger pad surface 31*a* of the distal phalanx section I3 of the second finger 3 be brought into contact with the side surface closer to the height of the center of gravity of the target object T71 or T72.

FIG. 16 illustrates an example of an operation in the second operation mode in a case where a prismatic object (e.g., a rectangular parallelepiped or cube specifically having a large height or a large thickness) T81 is a target for gripping. FIG. 17 illustrates an example of an operation in the second operation mode in a case where an inclined-surface object (e.g., a triangular prism specifically having a bottom surface with two longer sides than another side or a quadrangular pyramid specifically having a large height) T91 is a target for gripping. An operation of the robot hand H in this case is similar to that illustrated in FIGS. 15A and 15B.

FIG. 18 illustrates an example of an operation in the second operation mode in a case where a columnar or long object (e.g., an object specifically having a large moment load such as a handle of a frying pan) T101 is a target for gripping. The distal surface 11 of the palm section 1 is brought into contact with the target object T101, and the finger pad surface 21 of the first finger 2 (in this case, a finger pad surface close to the root of the first finger 1) is further brought into contact with the target object T101. Thereafter, the proximal joint j1 is rotated, and the middle joint j2 and the distal joint j3 are bent, thereby closing the second finger 3 to surround the target object T101.

FIG. 19 illustrates an example of an operation in the second operation mode in a case where an object T111 having a tapered side surface is a target for gripping. An operation of the robot hand H in this case is approximate to the operation illustrated in FIGS. 13A and 13B, even though the operation illustrated in FIGS. 13A and 13B is performed in a different mode. The robot hand H is laid, and is brought close to the target object T111 from sides in a state in which the angle of the fingertip section of the first finger 2 is adjusted by an operation of the wrist section 5. The distal surface 11 of the palm section 1 is then brought into contact with the target object T111, and thereafter, the finger pad surface 21 of the fingertip section of the first finger 2 is brought into contact with a side surface of the target object T111. Furthermore, the angle of the distal phalanx section I3 of the second finger 3 is adjusted to inclination of the side surface of the target object T111 by relatively rotating the first finger 2 about the fourth axis Ax4, and while the distal phalanx section I3 is maintained at the adjusted angle, the distal phalanx section 13 is brought close to a side surface on opposite side of the target object T111 to bring the finger pad surface 31*a* into contact with the target object T111.

1.4.3. Third Operation Mode

In addition to the above modes, in the present embodiment, a third operation mode is adopted in which the first finger 2 is opened in a plane perpendicular to the central axis Ax0 of the palm section 1.

FIGS. 20A and 20B illustrate an example of a state of the robot hand H in the third operation mode in which the first finger 2 is opened widely, for example, to a maximum opening degree at which an angle formed between a direction where the finger pad surface 21 of the first finger 2 faces and a direction where the finger pad surfaces 31*a* and 31*b* of the second finger 3 faces exceeds 90 degrees. In the third operation mode, it is possible to widely open the palm section 1, and the third operation mode is adaptable to applications using the finger pad surfaces 31*a* and 31*b* of the entire second finger 3.

FIG. 21 illustrates a use example of gripping in the third operation mode. A pair of robot hands H are disposed in mirror symmetry to enable execution of gripping with both hands using both arms. This makes it possible to take an approach of supporting the target object T121 with a wide plane or holding the target object T121 by sandwiching the target object T121 from both sides.

1.5. Workings and Effects

According to a typical parallel gripper as an effector included in a manipulator of a robot arm or the like, in many cases, contact of the parallel gripper with the target object is line contact or point contact, and the shape of the target object that is stably grippable is limited. For stable gripping of target objects having various shapes, it is desired to make controllable the position of a contact section of the robot hand with the target object and the angle of the robot hand or a finger thereof upon bringing the robot hand close to the target object. However, it is necessary to increase degrees of freedom of motion of the robot hand, which causes an issue that an increase in size of the robot hand occurs and configuration complication and an increase in weight further occur. Furthermore, the increase in size of the robot hand causes an increase in load on an arm supporting the robot hand, which induces an issue that applications to which the robot hand is applicable are limited.

Here, the robot hand having a multi-flexible multi-finger configuration makes it possible to secure gripping stability. However, in a multi-flexible multi-finger hand, an increase in size and configuration complication are not avoidable, and in many cases, a mechanism that interlocks a DIP joint and a PIP joint with each other is adopted; therefore, it is difficult to secure sufficient operability. The same applies to an underactuated hand by tendon drive, and it is difficult to sufficiently cope with adjustment of a relative angle between fingers.

In contrast, according to the present embodiment, relative positions and angles of the finger pad surfaces 21, 31*a*, and 31*b* of the first finger 2 and the second finger 3 are changed in accordance with the size, shape, and the like of the target object, which makes it possible to secure a necessary contact area of the robot hand H for gripping the target object and secure gripping stability of the robot hand H. Here, in the present embodiment, two fingers 2 and 3 are included, and the first finger 2 that is one of the two fingers 2 and 3 does not have degrees of freedom in bending and stretching directions, and the second finger 3 that is the other finger is configured to have degrees of freedom in bending and stretching direction by two joints (the middle joint j2 and the distal joint j3), in addition to a degree of freedom in a rotation direction at a joint (proximal joint j1) of a root portion, which makes it possible to minimize the number of degrees of freedom given to fingers and suppress an increase in the number of components. As described above, according to the present embodiment, it is possible to achieve both securing of gripping stability and suppression of an increase in size due to an increase in the degrees of freedom.

The first finger 2 does not have degrees of freedom in bending and stretching directions, which allows for high-load manipulation on a target object having a large weight. For example, manipulation is possible such as pushing, pulling, rotating, crushing, tapping, rubbing, supporting, and hooking and moving of the target object. Moreover, rattling of a joint due to backlash does not occur, which allows for a highly accurate operation by the first finger 2. Furthermore, it is possible to eliminate joints due to reduction in degrees of freedom, which makes it easy to apply treatment such as waterproofing and dustproofing.

The finger width of the first finger 2, especially, the finger width of the fingertip section of the first finger 2 is narrow, which allows for manipulation on a fine target object. For example, it is easy to perform, for example, an operation such as inserting the fingertip section into a narrow hole or depression (hooking on a handle and pulling a target), or pushing a narrow surface with a fingertip section (locally pushing the target object). Moreover, while the finger pad surface 21 of the first finger 2 is put to an inner surface of a shell of the target object having a shell shape, specifically the finger pad surface 31*a* of the distal phalanx section 13 of the second finger is put to an outer surface of the shell, which makes it possible to secure contact areas with both the inner surface and the outer surface of the shell by pinching an edge of the target object, and provide stable gripping.

In contrast, the finger width of the second finger 3 is wide, which makes it easy to secure mounting space for an actuator that drives a joint of the second finger 3 (in other words, to achieve an increase in grip force by mounting a large actuator) and mount a sensor on the second finger 3. For example, it is possible to mount a plurality of sensors on each of link portions between joints, that is, the base phalanx section 11, the middle phalanx section 12, and the distal phalanx section 13.

The first finger 2 is revolvable about the fourth axis Ax4 in parallel to the central axis Ax0 with respect to the palm section 1, which makes it possible to change relative angles of the finger pad surfaces 21, 31*a*, and 31*b* of the first finger 2 and the second finger 3 in a plane perpendicular to the central axis Ax0 of the palm section 1, and grip the target object having a inclined surface or a tapered shape with the angle or direction of the finger pad section that is coincident with the target object. Furthermore, upon gripping, it is possible to adjust a positional relationship of the first finger 2 and the second finger 3 in accordance with dimensions of the target object and achieve appropriate grip force. The first finger 2 is revolved about the fourth axis Ax4 to bring the first axis 2 and the second finger 3 close to each other and reduce volumetric capacity of space occupied by the entire robot hand H, which makes it possible to reduce storage space and cope with applications in a narrow place.

The first finger 2 is opened in a plane perpendicular to the central axis Ax0 of the palm section 1, which makes it possible to naturally execute interaction accompanied by contact such as handshaking with a human, and makes it possible to cope with applications (e.g., an operation of wiping a table) in a state in which the palm section 1 is widely opened. Furthermore, disposing a pair of robot hands H in such an operation mode in mirror symmetry enables execution of gripping with both hands using both arms, which makes it possible to take an approach of supporting the target object with a large plane or holding the target object by sandwiching the target object from both sides. In such a case, it is possible to avoid the first finger 2 from being an obstruction.

An angle upon making the finger pad surface 21 of the first finger 2 in contact with the target object is adjustable by the wrist section 5, which makes it possible to achieve higher gripping stability.

1.6. Description of Modification Examples

1.6.1. First Modification Example

FIG. 22 is a perspective view of a first modification example of the robot hand H according to the first embodiment of the present disclosure.

In the first modification example, a gripping assist unit U that supports gripping of the target object is disposed in each of the phalanx sections 11, 12, and 13 of the second finger 3. Examples of units applicable to the gripping assist unit U may include a variable adhesion unit or a variable friction unit in which adhesive force or friction force is adjustable. As the gripping assist unit U, it is possible to adopt a variable suction unit in which suction force is exerted on the target object and the suction force is adjustable.

1.6.2. Second Modification Example

FIG. 23 is a perspective view of a second modification example of the robot hand H according to the first embodiment of the present disclosure.

In the second modification example, a brake mechanism B that is configured to be able to fix a relative positional relationship of the base phalanx section 11, the middle phalanx section 12, and the distal phalanx section 13 is disposed in the robot hand H. Examples of the applicable brake mechanism B may include a wire-driving brake mechanism. The brake mechanism makes it possible to support grip force by an actuator, and produce grip force by a mechanical limit of the brake mechanism independent of output of the actuator.

In place of or in addition to the brake mechanism, it is possible to provide a biasing mechanism that is configured to be able to bias the proximal joint j1, the middle joint j2, and the distal joint j3 in a bending or stretching direction of the second finger 3. The second finger 3 is bent by the biasing mechanism at the time of stopping the robot hand H so as to fold the finger, which makes it possible to reduce volumetric capacity of space occupied by the entire robot hand H, and reduce storage space.

2. Second Embodiment

FIG. 24 is a perspective view of an appearance of a robot hand H' according to a second embodiment of the present disclosure.

In the present embodiment, a size relationship of the finger widths of the first finger 2 and the second finger 3 included in a robot hand H' is opposite to that in the first embodiment described above. In such a manner, the robot hand H' may have a configuration including the first finger 2 having a wide finger width (specifically, a finger width of a tip) and the second finger 3 having a narrower finger width (specifically, a finger width of a distal phalanx section) than the first finger 2. As with the first embodiment described above, the first finger 2 does not have degrees of freedom in the bending and stretching directions, and the second finger 3 has three degrees of freedom by the proximal, middle, and distal joints j1, j2, and j3.

3. Conclusion

The embodiments of the present disclosure have been described in detail above with reference to the drawings. According to the embodiments of the present disclosure, it is possible to achieve both securing of gripping stability and suppression of an increase in size.

The technology according to the present disclosure is not limited to the embodiments described above, and may be modified in a variety of ways, and a combination of modification examples is also possible.

Further, not all of the configurations and operations described in the respective embodiments are indispensable as the configurations and operations of the present disclosure. For example, among the components in the respective embodiments, components not described in the independent claim indicating the most significant concepts of the present disclosure are to be understood as optional components.

Terms used throughout this specification and the appended claims should be construed as "non-limiting" terms. For example, the term "including" or "included" should be construed as "not limited to what is described as being included". The term "having" should be construed as "not limited to what is described as being had".

The terms used herein are used merely for the convenience of description and include terms that are not used to limit the configuration, the operation, and the like. For example, the terms such as "right", "left", "up", and "down" only indicate directions in the drawings being referred to. In addition, the terms "inside" and "outside" only indicate a direction toward the center of a component of interest and a direction away from the center of a component of interest, respectively. The same applies to terms similar to these and to terms with the similar purpose.

The technology according to the present disclosure may have the following configurations. According to the technology according to the present disclosure having the following configurations, it is possible to achieve both securing of gripping stability and suppression of an increase in size. Effects attained by the technology according to the present disclosure are not necessarily limited to the effects described herein, but may include any of the effects described in the present disclosure.

(1)

A robot hand including:

a palm section;

a first finger extending from the palm section to distal side, and having a finger pad surface opposed to a central axis of the palm section; and a second finger extending from the palm section to the distal side, and having a finger pad surface opposed to the finger pad surface of the first finger with the central axis interposed therebetween, in which the palm section includes a proximal joint that couples the second finger to the palm section pivotably about a first axis, the first finger does not have degrees of freedom in bending and stretching directions, the second finger includes a base phalanx section provided close to the palm section, a distal phalanx section provided closer to the distal side than the base phalanx section, and a middle phalanx section provided between the base phalanx section and the distal phalanx section, and the second finger includes a middle joint and a distal joint, the middle joint that couples the middle phalanx section to the base phalanx section bendably and strechably about a second axis, and the distal joint that couples the distal phalanx section to the middle phalanx section bendably and strechably about a third axis.

(2)

The robot hand according to (1), in which the first finger has a narrower finger width than the second finger.

(3)

The robot hand according to (2), in which the first finger has a fingertip section having a narrower finger width than a finger width of the distal phalanx section of the second finger.

(4)

The robot hand according to any one of (1) to (3), in which the first finger has a shape in which the finger pad surface is gradually separated from the central axis of the palm section toward a fingertip section from a base of the finger pad surface.

(5)

The robot hand according to (4), in which the first finger has an initial opening angle that is an angle formed between a straight line connecting the base and a tip of the finger pad surface and a reference line parallel to the central axis of the palm section, and the initial opening angle is within a range from 10 degrees to 60 degrees.

(6)

The robot hand according to any one of (1) to (5), in which the first, second, and third axes are parallel to each other.

(7)

The robot hand according to any one of (1) to (6), in which the first axis three-dimensionally intersects with the central axis of the palm section.

(8)

The robot hand according to any one of (1) to (7), in which the proximal joint has a larger diameter than the middle joint and the distal joint.

(9)

The robot hand according to any one of (1) to (8), in which the palm section includes a sensor that is configured to be able to detect the target object.

(10)

The robot hand according to any one of (1) to (9), in which the second finger includes a sensor that is configured to be able to detect the target object in at least one of the distal phalanx section, the middle phalanx section, or the base phalanx section.

(11)

The robot hand according to (10), in which the second finger includes the sensor in each of the distal phalanx section and the middle phalanx section, and the sensor included in the distal phalanx section has higher resolution than the sensor included in the middle phalanx section.

(12)

The robot hand according to (10) or (11), in which the second finger includes the sensor in each of the distal phalanx section and the middle phalanx section, and the sensor included in the middle phalanx section has a higher load range than the sensor included in the distal phalanx section.

(13)

The robot hand according to any one of (1) to (12), in which the first finger is further configured to be revolvable about a fourth axis with respect to the palm section, the fourth axis being coincident with the central axis or parallel to the central axis.

(14)

The robot hand according to (13), in which the first axis and the fourth axis three-dimensionally intersect with each other.

(15)

The robot hand according to any one of (1) to (14), further including a wrist section that is coupled to proximal side of the palm section, and is configured to be able to give rotation about a fifth axis to the palm section, the fifth axis being parallel or perpendicular to the central axis.

(16)

The robot hand according to any one of (1) to (15), including a brake mechanism that is configured to be able to fix a relative positional relationship of the base phalanx section, the middle phalanx section, and the distal phalanx section.

(17)

The robot hand according to any one of (1) to (16), including a biasing mechanism that is configured to be able to bias the proximal joint, the middle joint, and the distal joint in a bending or stretching direction of the second finger.

(18)

A manipulator provided with an operation arm and a robot hand, the operation arm including a base end and a terminal end, and extending in an axial direction from the base end to the terminal end, and the robot hand coupled to the terminal end of the operation arm, the robot hand including:

a palm section;

a first finger extending from the palm section to distal side, and having a finger pad surface opposed to a central axis of the palm section; and a second finger extending from the palm section to the distal side, and having a finger pad surface opposed to the finger pad surface of the first finger with the central axis interposed therebetween, in which the palm section includes a proximal joint that couples the second finger to the palm section pivotably about a first axis, the first finger does not have degrees of freedom in bending and stretching directions, the second finger includes a base phalanx section provided close to the palm section, a distal phalanx section provided closer to the distal side than the base phalanx section, and a middle phalanx section provided between the base phalanx section and the distal phalanx section, and the second finger includes a middle joint and a distal joint, the middle joint that couples the middle phalanx section to the base phalanx section bendably and strechably about a second axis, and the distal joint that couples the distal phalanx section to the middle phalanx section bendably and strechably about a third axis.

This application claims the benefit of Japanese Priority Patent Application JP2020-112135 filed with Japan Patent Office on Jun. 29, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A robot hand, comprising:

a wrist section;

a palm section including a proximal joint and a central axis;

a first finger that extends from the palm section to a distal side of the robot hand, wherein the first finger includes a first finger pad surface opposite to the central axis of the palm section, an angle between the first finger pad surface and a target object is adjustable by an operation of the wrist section, the first finger is configured to revolve about a specific axis with respect to the palm section, and the specific axis is coincident with the central axis of the palm section; and a second finger that extends from the palm section to the distal side of the robot hand, wherein the second finger includes:

a second finger pad surface opposite to the first finger pad surface;

a base phalanx section;

a distal phalanx section:
a middle phalanx section:
a middle joint; and
a distal joint,
the central axis of the palm section is between the first finger pad surface and the second finger pad surface,
the proximal joint is configured to pivotably couple the second finger to the palm section about a first axis,
the first axis is with respect to the palm section,
the first finger lacks degrees of freedom in a bending direction and a stretching direction,
the base phalanx section is adjacent to the palm section,
a distance between the distal phalanx section and the distal side of the robot hand is less than a distance between the base phalanx section and the distal side of the robot hand,
the middle phalanx section is between the base phalanx section and the distal phalanx section,
the middle joint is configured to couple the middle phalanx section to the base phalanx section bendably and strechably about a second axis,
the distal joint is configured to couple the distal phalanx section to the middle phalanx section bendably and strechably about a third axis, and
each of the second axis and the third axis is with respect to the palm section.

2. The robot hand according to claim 1, wherein a finger width of the first finger is narrower than a finger width of the second finger.

3. The robot hand according to claim 2, wherein a finger width of a fingertip section of the first finger is narrower than a finger width of the distal phalanx section of the second finger.

4. The robot hand according to claim 1, further comprising a fingertip section, wherein
the first finger has a shape in which the first finger pad surface is separated from the central axis of the palm section, and
the separation of the first finger pad surface from the central axis of the palm section is toward the fingertip section from a base of the first finger pad surface.

5. The robot hand according to claim 4, wherein
the first finger has an initial opening angle between a straight line and a reference line,
the straight line connects the base of the first finger pad surface and a tip of the first finger pad surface,
the reference line is parallel to the central axis of the palm section, and
the initial opening angle is within a range from 10 degrees to 60 degrees.

6. The robot hand according to claim 1, wherein
the first axis is parallel to each of the second axis and the third axis, and
the second axis is parallel to the third axis.

7. The robot hand according to claim 1, wherein the first axis intersects with the central axis of the palm section in a three-dimensional space.

8. The robot hand according to claim 1, wherein a diameter of the proximal joint is larger than a diameter of the middle joint and a diameter of the distal joint.

9. The robot hand according to claim 1, wherein the palm section includes a sensor that is configured to detect the target object.

10. The robot hand according to claim 1, wherein the second finger includes a plurality of sensor that is configured to detect the target object in at least one of the distal phalanx section, the middle phalanx section, or the base phalanx section.

11. The robot hand according to claim 10, wherein
the plurality of sensors includes a first sensor and a second sensor,
the first sensor is in the distal phalanx section and the second sensor in the middle phalanx section, and
a resolution of the first sensor is higher than a resolution of the second sensor.

12. The robot hand according to claim 10, wherein
the plurality of sensors includes a first sensor and a second sensor,
the first sensor is in the distal phalanx section and the second sensor in the middle phalanx section, and
a load range of the second sensor is higher than a load range of the first sensor.

13. The robot hand according to claim 1, wherein the first axis and a fourth axis intersect in a three-dimensional space.

14. The robot hand according to claim 1, wherein
the wrist section is coupled to a proximal side of the palm section,
the wrist section is configured to rotate the palm section about a fourth axis, and
the fourth axis is one of parallel to the central axis or perpendicular to the central axis.

15. The robot hand according to claim 1, comprising a brake mechanism that is configured to fix a relative positional relationship of the base phalanx section, the middle phalanx section, and the distal phalanx section.

16. The robot hand according to claim 1, comprising a biasing mechanism that is configured to bias each of the proximal joint, the middle joint, and the distal joint in one of a bending direction of the second finger or a stretching direction of the second finger.

17. A manipulator, comprising:
an operation arm; and
a robot hand, wherein
the operation arm includes a base end and a terminal end,
the operation arm extends in an axial direction from the base end to the terminal end,
the robot hand is coupled to the terminal end of the operation arm, and
the robot hand comprises:
a wrist section:
a palm section including a proximal joint and a central axis;
a first finger that extends from the palm section to a distal side of the robot hand, wherein
the first finger includes a first finger pad surface opposite to the central axis of the palm section,
an angle between the first finger pad surface and a target object is adjustable by an operation of the wrist section,
the first finger is configured to revolve about a specific axis with respect to the palm section, and
the specific axis is coincident with the central axis of the palm section; and
a second finger that extends from the palm section to the distal side of the robot hand, wherein
the second finger includes:
a second finger pad surface opposed to the first finger pad surface of the first finger;
a base phalanx section;
a distal phalanx section;

a middle phalanx section;
a middle joint; and
a distal joint,
the central axis of the palm section is between the first finger pad surface and the second finger pad surface,
the proximal joint is configured to pivotably couple the second finger to the palm section about a first axis,
the first axis is with respect to the palm section,
the first finger lacks degrees of freedom in a bending direction and a stretching direction,
the base phalanx section is adjacent to the palm section,
a distance between the distal phalanx section and the distal side of the robot hand is less than a distance between the base phalanx section and the distal side of the robot hand,
the middle phalanx section is between the base phalanx section and the distal phalanx section,
the middle joint is configured to couple the middle phalanx section to the base phalanx section bendably and strechably about a second axis,
the distal joint is configured to couple the distal phalanx section to the middle phalanx section bendably and strechably about a third axis, and
each of the second axis and the third axis is with respect to the palm section.

* * * * *